(12) United States Patent
Lee et al.

(10) Patent No.: US 11,641,221 B2
(45) Date of Patent: May 2, 2023

(54) WIRELESS POWER TRANSMITTER, WIRELESS POWER RECEIVER, AND CONTROL METHODS THEREOF

(71) Applicant: Samsung Electronics Co., Ltd., Gyeonggi-do (KR)

(72) Inventors: Kyung-Woo Lee, Seoul (KR); Sang-Wook Kwon, Gyeonggi-do (KR); Sung-Kweon Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/548,345

(22) Filed: Aug. 22, 2019

(65) Prior Publication Data
US 2019/0379425 A1    Dec. 12, 2019

Related U.S. Application Data

(63) Continuation of application No. 15/625,410, filed on Jun. 16, 2017.
(Continued)

(30) Foreign Application Priority Data

Aug. 8, 2016    (KR) ........................ 10-2016-0100785

(51) Int. Cl.
*H02J 50/60* (2016.01)
*H04B 5/00* (2006.01)
(Continued)

(52) U.S. Cl.
CPC ........ *H04B 5/0037* (2013.01); *H02J 7/00034* (2020.01); *H02J 50/12* (2016.02);
(Continued)

(58) Field of Classification Search
None
See application file for complete search history.

(56) References Cited

U.S. PATENT DOCUMENTS 9,787,366 B1 * 10/2017 Shirani-Mehr ....... H04W 8/005
2010/0279606 A1   11/2010 Hillan et al.
(Continued)

FOREIGN PATENT DOCUMENTS

CN         102318216       1/2012
CN         102780515       11/2012
(Continued)

OTHER PUBLICATIONS

International Search Report dated Aug. 18, 2017 issued in counterpart application No. PCT/KR2017/005905, 8 pages.
(Continued)

*Primary Examiner* — Daniel Kessie
(74) *Attorney, Agent, or Firm* — The Farrell Law Firm, P.C.

(57) ABSTRACT

A wireless power receiver, and control methods thereof are provided. The wireless power receiver includes a communication module; and a controller. The controller is configured to identify whether a near-field communication (NFC) tag is detected, wherein the NFC tag is external to a wireless power transmitter and the wireless power receiver, and transmit, by using the communication module, a signal indicating whether the NFC tag is detected to the wireless power transmitter.

26 Claims, 22 Drawing Sheets

Related U.S. Application Data

(60) Provisional application No. 62/351,021, filed on Jun. 16, 2016.

(51) Int. Cl.
  *H02J 50/80* (2016.01)
  *H02J 50/90* (2016.01)
  *H02J 7/00* (2006.01)
  *H02J 50/12* (2016.01)

(52) U.S. Cl.
  CPC .............. *H02J 50/60* (2016.02); *H02J 50/80* (2016.02); *H02J 50/90* (2016.02)

(56) References Cited

U.S. PATENT DOCUMENTS

| | | |
|---|---|---|
| 2012/0280650 A1 | 11/2012 | Kim et al. |
| 2013/0057079 A1 | 3/2013 | Park et al. |
| 2013/0062959 A1* | 3/2013 | Lee .................. H02J 50/12 307/104 |
| 2013/0099734 A1 | 4/2013 | Lee et al. |
| 2013/0178156 A1* | 7/2013 | Kim .................. H04W 12/12 455/41.1 |
| 2013/0317924 A1* | 11/2013 | Bush .................. G06Q 20/326 705/16 |
| 2014/0141715 A1 | 5/2014 | Smith |
| 2014/0159653 A1 | 6/2014 | Von Novak et al. |
| 2014/0333145 A1 | 11/2014 | Lee et al. |
| 2015/0087228 A1 | 3/2015 | Porat et al. |
| 2015/0091502 A1 | 4/2015 | Mukherjee et al. |
| 2015/0154486 A1 | 6/2015 | McFarthing et al. |
| 2015/0155740 A1* | 6/2015 | Yoon .................. H02J 50/90 320/108 |
| 2015/0180268 A1 | 6/2015 | Byun et al. |
| 2015/0207340 A1 | 7/2015 | McFarthing |
| 2015/0340906 A1 | 11/2015 | Low et al. |
| 2015/0372496 A1 | 12/2015 | Lee et al. |
| 2016/0020831 A1* | 1/2016 | Hamada .................. H02J 50/80 320/108 |
| 2016/0087447 A1 | 3/2016 | Laudebat et al. |
| 2016/0112098 A1* | 4/2016 | Jin .................. H04W 4/50 455/41.1 |
| 2016/0336804 A1 | 11/2016 | Son et al. |
| 2017/0085128 A1* | 3/2017 | Garcia Briz ............ B60L 53/62 |
| 2017/0085297 A1 | 3/2017 | Gao et al. |
| 2017/0098149 A1 | 4/2017 | Kesler et al. |
| 2017/0187221 A1 | 6/2017 | Konanur et al. |
| 2019/0013703 A1* | 1/2019 | Shichino ................ H02J 50/80 |
| 2019/0146926 A1* | 5/2019 | Lee .................... G06F 12/0292 711/154 |

FOREIGN PATENT DOCUMENTS

| | | |
|---|---|---|
| CN | 103117813 | 5/2013 |
| CN | 204030732 | 12/2014 |
| CN | 104518276 | 4/2015 |
| CN | 104521106 | 4/2015 |
| CN | 105191063 | 12/2015 |
| EP | 3 001 533 | 3/2016 |
| KR | 1020130045215 | 5/2013 |
| WO | WO 2010/093965 | 8/2010 |
| WO | WO 2015/102454 | 7/2015 |

OTHER PUBLICATIONS

European Search Report dated Apr. 12, 2019 issued in counterpart application No. 17813511.7-1202, 5 pages.
U.S. Office Action dated Apr. 7, 2020 issued in counterpart U.S. Appl. No. 15/625,410, 12 pages.
U.S. Office Action dated Nov. 4, 2019 issued in counterpart U.S. Appl. No. 15/625,410, 11 pages.
U.S. Office Action dated May 3, 2021 issued in counterpart U.S. Appl. No. 15/625,410, 13 pages.
Chinese Office Action dated Aug. 4, 2021 issued in counterpart application No. 201780037653.9, 18 pages.
Chinese Office Action dated Apr. 20, 2022 issued in counterpart application No. 201780037653.9, 15 pages.
Korean Office Action dated Mar. 10, 2023 issued in counterpart application No. 10-2016-0100785, 13 pages.

* cited by examiner

WIRELESS POWER TRANSMITTER, WIRELESS POWER RECEIVER, AND CONTROL METHODS THEREOF

PRIORITY

This application is a Continuation of U.S. Ser. No. 15/625,410, which was filed in the U.S. Patent and Trademark Office (USPTO) on Jun. 16, 2017, and claims priority under 35 U.S.C. § 119(e) to U.S. Provisional Application No. 62/351,021, filed in the USPTO on Jun. 16, 2016, and under 35 U.S.C. § 119(a) to Korean Patent Application No. 10-2016-0100785, filed in the Korean Intellectual Property Office on Aug. 8, 2016, the entire content of each of which is incorporated herein by reference.

BACKGROUND

1. Field of the Disclosure

The present disclosure relates generally to a wireless power transmitter, a wireless power receiver, and control methods thereof, and more particularly, to a wireless power transmitter that wirelessly transmits power to a wireless power receiver, the wireless power receiver that wirelessly receives power from the wireless power transmitter, and control methods thereof.

2. Description of the Related Art

Mobile terminals such as mobile phones, personal digital assistants (PDAs), and the like are powered by rechargeable batteries. The battery of the mobile terminal is charged with electrical energy by a separate charging device. Typically, a separate contact terminal is formed on the outer side of each of the charging device and the battery, and the charging device and the battery are electrically connected to each other through contact between the two separate contact terminals.

However, in a contact-type charging scheme, the contact terminals protrude outwardly, and thus are easily contaminated by foreign substances. As a result, a problem arises in that battery charging is not correctly performed. Further, battery charging may not be correctly performed when the contact terminals are exposed to moisture.

In order to solve the above-mentioned problems, a wireless charging technology or a non-contact charging technology has recently been developed and used in many electronic devices.

The wireless charging technology uses wireless power transmission and reception, and corresponds to, for example, a system in which a battery is automatically charged if the battery is just put on a charging pad without connecting the mobile phone to a separate charging connector. Typically, the wireless charging technology is known to be used in wireless electric toothbrushes or wireless electric shavers. The wireless charging technology can improve a waterproof function because it can be used to wirelessly charge the electronic devices. The wireless charging technology can also improve the portability of the electronic devices because it does not require a wired charger. Therefore, it is expected that technologies related to the wireless charging technology will be significantly developed in the coming age of electric cars.

The wireless charging technology generally includes an electromagnetic induction scheme using a coil, a resonance scheme using resonance, and a radio frequency (RF)/microwave radiation scheme for converting electrical energy into microwaves and transmitting the microwaves.

Until now, the wireless charging technology using the electromagnetic induction scheme has been the mainstream technology. However, recently, experiments in which power is wirelessly transmitted over a distance of several tens of meters by using microwaves have been successful at home and abroad. Accordingly, it is expected that an environment in which all electronic devices can be wirelessly charged anytime and anywhere will be realized in the near future.

A power transmission method using electromagnetic induction corresponds to a scheme for transmitting power between a primary coil and a secondary coil. When a magnet approaches the coil, an induced current is generated. A transmission side generates a magnetic field by using the induction current, and a reception side generates electrical energy by inducing a current according to a change in the magnetic field. This phenomenon is called a magnetic induction phenomenon, and the power transmission method using this phenomenon has excellent energy transmission efficiency.

With respect to the resonance scheme, a system has been developed in which electricity is wirelessly transferred from a charging device to a device to be charged by using a power transmission principle of the resonance scheme, known as a coupled mode theory, even when the device to be charged is several meters away from the charging device. This system employs the physics concept called "resonance" in which, when a tuning fork oscillates at a particular frequency, a wine glass next to the tuning fork will oscillate at the same frequency. An electromagnetic wave containing electrical energy was caused to resonate, instead of causing sound to resonate. It is known that the resonant electrical energy does not affect surrounding machines and human bodies differently from other electromagnetic waves because the resonant electrical energy is directly transferred only to a device having a resonance frequency and its unused part is reabsorbed into an electromagnetic field instead of spreading into the air.

A wireless power transmitter may transmit an electromagnetic wave to a wireless power receiver, and the magnitude of an electromagnetic wave for delivering power may be larger than that of another communication signal. Accordingly, the electromagnetic wave from the wireless power transmitter may be absorbed into another communication antenna and the like, which may cause the destruction of the other communication antenna or a communication module.

SUMMARY

The present disclosure has been made to address at least the above-mentioned problems and/or disadvantages and to provide at least the advantages described below.

Accordingly, an aspect of the present disclosure is to provide a wireless power transmitter and a wireless power receiver that transmits and receives wireless power only when a communication antenna, e.g., a near-field communication (NFC) tag, is not placed around the wireless power transmitter and the wireless power receiver, so that the inflow of an electromagnetic wave into another communication antenna during wireless charging can be prevented and, thus, the degradation of the other communication antenna can be prevented.

Accordingly an aspect of the present disclosure is to provide a wireless power transmitter which does not transmit wireless power when an NFC tag or antennas based on various other communication schemes are placed on the wireless power transmitter.

In accordance with an aspect of the present disclosure, a wireless power receiver is provided, which includes a communication module; and a controller. The controller is configured to identify whether an NFC tag is detected, wherein the NFC tag is external to a wireless power transmitter and the wireless power receiver, and transmit, by using the communication module, a signal indicating whether the NFC tag is detected to the wireless power transmitter.

In accordance with another aspect of the present disclosure, a control method is provided for a wireless power receiver. The control method includes identifying whether a near-field communication (NFC) tag is detected, wherein the NFC tag is external to a wireless power transmitter and the wireless power receiver; and transmitting a signal indicating whether the NFC tag is detected to the wireless power transmitter.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
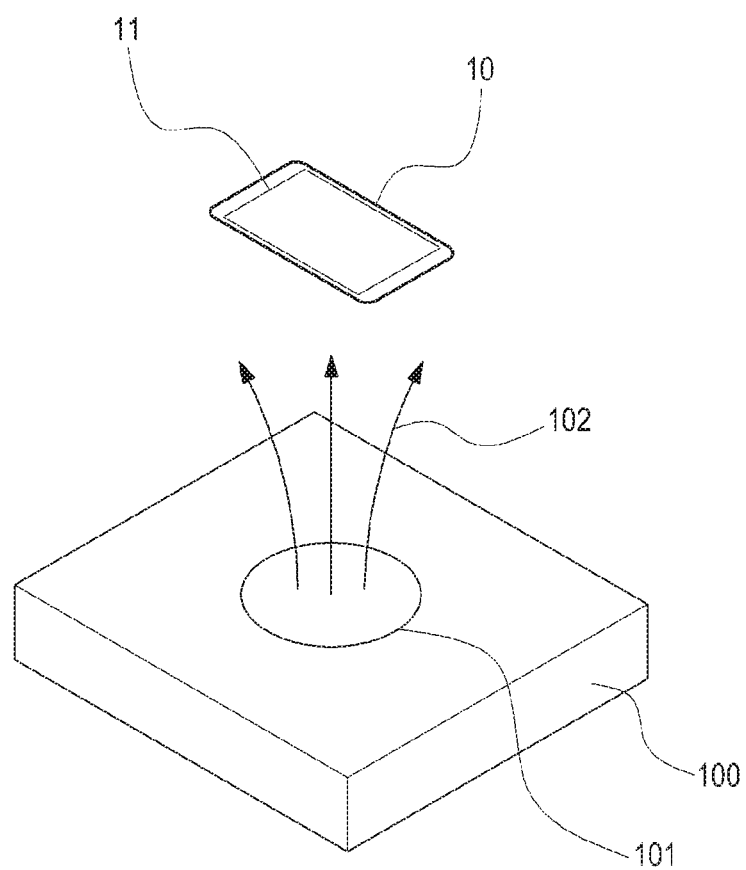
FIG. 1 is a diagram of an inflow of an electromagnetic wave from a wireless power transmitter into a near-field communication (NFC) tag, according to an embodiment of the present disclosure.

Hereinafter, embodiments of the present disclosure will be described in more detail with reference to the accompanying drawings. It should be noted that the same elements in the accompanying drawings will be designated by the same reference numerals wherever possible. A detailed description of known functions and configurations, which may unnecessarily obscure the subject matter of the present disclosure will be omitted in the following description and the accompanying drawings.

FIG. 1 is a diagram of an inflow of an electromagnetic wave from a wireless power transmitter into a near-field communication (NFC) tag, according to an embodiment of the present disclosure. Referring to FIG. 1, a wireless power transmitter 100 and an electronic card 10 having an NFC tag are provided. An NFC antenna 11 may be included within the NFC tag of the electronic card 10. The NFC antenna 11 may have a resonance frequency of 13.56 MHz, for example, defined by an NFC communication scheme. The wireless power transmitter 100 may include a resonant circuit 101 for generating an electromagnetic wave 102. For example, when the wireless power transmitter 100 generates an electromagnetic wave 102 according to an alliance for wireless power (A4WP) scheme, the resonant circuit 101 may have a resonance frequency of 6.78 MHz, for example. Alternatively, when the wireless power transmitter 100 generates an electromagnetic wave 102 according to a Wireless Power Consortium (WPC) scheme, the resonant circuit 101 may have a resonance frequency of 100 to 200 kHz, for example. Accordingly, the electromagnetic wave 102 generated by the resonant circuit 101 may also have a frequency of 6.78 MHz or 100 to 200 kHz according to a communication scheme. Therefore, a resonance frequency of an NFC antenna 11 may be different from a frequency of the electromagnetic wave 102. However, the electromagnetic wave 102 may have a relatively large strength in order to transmit power, and accordingly, a part of the electromagnetic wave 102 may flow into the NFC antenna 11. The NFC antenna 11, a communication module connected to the NFC antenna 11, or the like may be destroyed by the electromagnetic wave 102. Accordingly, the NFC antenna 11 should be removed before a charging process caused by the electromagnetic wave 102.

Figure 2:
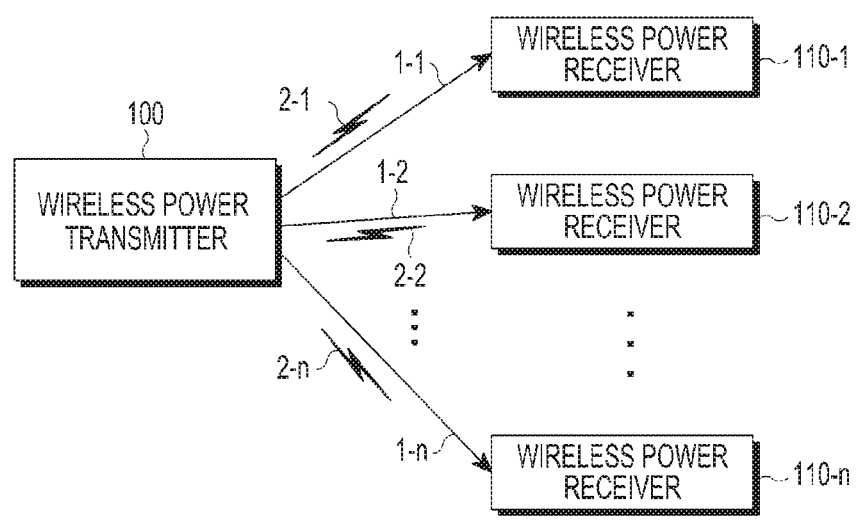
FIG. 2 is a block diagram of a wireless charging system, according to an embodiment of the present disclosure.

FIG. 2 is a block diagram of a wireless charging system, according to an embodiment of the present disclosure.

Referring to FIG. 2, a wireless charging system including a wireless power transmitter 100 and one or more wireless power receivers 110-1, 110-2, . . . , and 110-n is provided.

The wireless power transmitter 100 may wirelessly transmit power 1-1, power 1-2, . . . , and power 1-n to the one or more wireless power receivers 110-1, 110-2, . . . , and 110-n, respectively. More specifically, the wireless power transmitter 100 may wirelessly transmit power 1-1, power 1-2, . . . , and power 1-n to only the wireless power receivers authenticated after going through a predetermined authentication procedure.

The wireless power transmitter 100 may form an electrical connection to the wireless power receivers 110-1, 110-2, . . . , and 110-n. For example, the wireless power transmitter 100 may transmit wireless power having a form of an electromagnetic wave to each of the wireless power receivers 110-1, 110-2, . . . , and 110-n.

The wireless power transmitter 100 may perform bidirectional communication with the wireless power receivers 110-1, 110-2, . . . , and 110-n. Here, the wireless power transmitter 100 and the wireless power receivers 110-1, 110-2, . . . , and 110-n may process or transmit and receive packets 2-1, 2-2, . . . , and 2-n, each including predetermined frames. The predetermined frames will be described in more detail below. Particularly, the wireless power receiver may be implemented by using a mobile communication terminal, a PDA, a personal media player (PMP), a smart phone, or the like.

The wireless power transmitter 100 may wirelessly provide power to the multiple wireless power receivers 110-1, 110-2, . . . , and 110-n. For example, the wireless power transmitter 100 may transmit power to the multiple wireless power receivers 110-1, 110-2, . . . , and 110-n in the resonance scheme. When the wireless power transmitter 100 employs the resonance scheme, it is desirable that a distance between the wireless power transmitter 100 and the multiple wireless power receivers 110-1, 110-2, . . . , and 1110-n be less than or equal to 30 m, for example. Alternatively, when the wireless power transmitter 100 employs the electromagnetic induction scheme, it is desirable that a distance between the wireless power transmitter 100 and the multiple wireless power receivers 110-1, 110-2, . . . , and 110-n be less than or equal to 10 cm, for example.

Each of the wireless power receivers 110-1, 110-2, . . . , and 1110-n may receive wireless power from the wireless power transmitter 100 and may charge a battery included therein. Also, each of the wireless power receivers 110-1, 110-2, . . . , and 1110-n may transmit, to the wireless power transmitter 100, a signal for requesting the transmission of wireless power, information required to receive wireless power, state information of a wireless power receiver, or control information required by the wireless power transmitter 100. Information of the signal transmitted to the wireless power transmitter 100 will be described in more detail below.

Also, each of the wireless power receivers 110-1, 110-2, . . . , and 1110-n may transmit to the wireless power transmitter 100 a message indicating a charging status thereof.

The wireless power transmitter 100 may include a display means such as a display, and may display a state of each of the wireless power receivers 110-1, 110-2, . . . , and 1110-n based on a message received from each of the wireless power receivers 110-1, 110-2, . . . , and 1110-n. Also, the wireless power transmitter 100 may display an expected time period until the charging of each of the wireless power receivers 110-1, 110-2, . . . , and 1110-n is completed, together with the state of each of the wireless power receivers 110-1, 110-2, . . . , and 1110-n.

The wireless power transmitter 100 may transmit a control signal for disabling a wireless charging function of each of the wireless power receivers 110-1, 110-2, . . . , and 1110-n. The wireless power receiver that has received the control signal for disabling the wireless charging function from the wireless power transmitter 100 may disable the wireless charging function thereof.

Figure 3A:
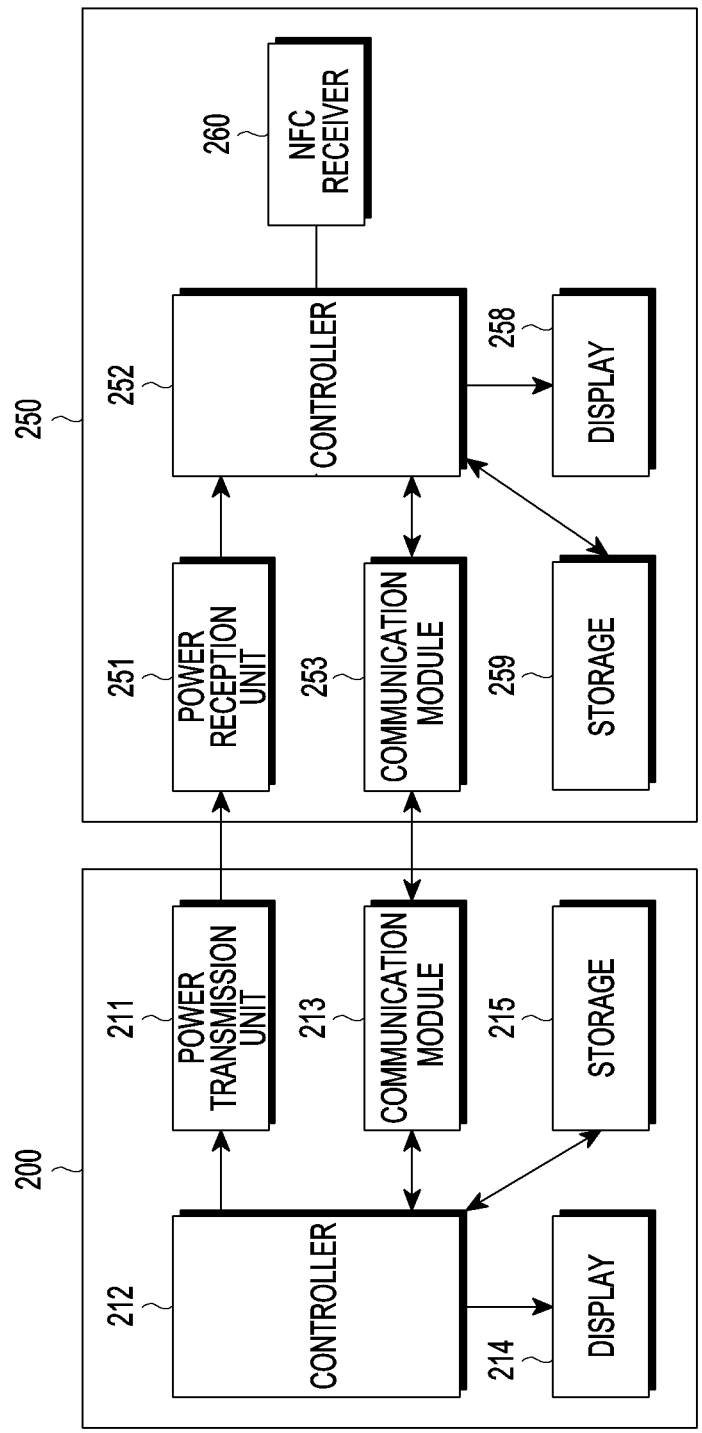
FIG. 3A is a block diagram of a wireless power transmitter and a wireless power receiver, according to an embodiment of the present disclosure.

FIG. 3A is a block diagram of a wireless power transmitter and a wireless power receiver, according to an embodiment of the present disclosure.

Referring to FIG. 3A, a wireless power transmitter 200 and a wireless power receiver 250 are provided. The wireless power transmitter 200 includes at least one of a power transmission unit 211, a controller 212, a communication module 213, a display 214, and a storage 215.

The power transmission unit 211 may provide power that the wireless power transmitter 200 requires, and may wirelessly provide power to the wireless power receiver 250. The power transmission unit 211 may supply power in the form of alternating current (AC). Alternatively, the power transmission unit 211 may convert the power in the form of direct current (DC) into power in the form of AC by using an inverter and may supply the power in the form of AC. The power transmission unit 211 may be implemented in the form of a built-in battery. Alternatively, the power transmission unit 211 may be implemented in the form of an interface for receiving power, and may serve to receive power from the outside and supply the received power to elements other than itself. Those skilled in the art will easily understand that the power transmission unit 211 is not limited as long as it corresponds to any means capable of providing power having an AC waveform.

The controller 212 may control an overall operation of the wireless power transmitter 200. The controller 212 may control the overall operation of the wireless power transmitter 200 by using an algorithm, a program, or an application which is read from the storage 215 and is required for control. The controller 212 may be implemented in the form of a central processing unit (CPU), a microprocessor, a minicomputer, or the like. Accordingly, the controller 212 may be referred to as micro-controlling unit (MCU) according to the implementation thereof.

The communication module 213 may communicate with the wireless power receiver 250 by using a predetermined scheme. The communication module 213 may receive power information from the wireless power receiver 250. The power information may include at least one of battery residual quantity, the number of times of charging, usage, battery capacity, and battery charge/consumption ratio of the wireless power receiver 250.

Also, the communication module 213 may transmit a charging function control signal for controlling a charging function of the wireless power receiver 250. The charging function control signal is a control signal which controls the wireless power reception unit 251 of the particular wireless power receiver 250 to enable or disable the charging function of the particular wireless power receiver 250. Alternatively, as described in more detail below, the power information may include information on, for example, insertion of a wired charging terminal, transition from an SA mode to a non-stand-alone (NSA) mode, release from an error situation, and the like. Also, the charging function control signal may include information related to the determination of a cross-connection. For example, the charging function control signal may include identification information, configuration information, and the like for determining the cross-connection, and may include pattern information or time information related to an impedance change of the wireless power receiver 250 for determining the cross-connection.

The communication module 213 may receive signals from another wireless power transmitter as well as from the wireless power receiver 250.

The controller 212 may display the state of the wireless power receiver 250 on the display 214 on the basis of a message received from the wireless power receiver 250 through the communication module 213. Also, the controller 212 may display, on the display 214, an expected time period until the wireless power receiver 250 is completely charged.

The wireless power receiver 250 includes at least one of a power reception unit 251, a controller 252, a communication module 253, a display 258, an NFC receiver 260, and a storage 259.

The power reception unit 251 may wirelessly receive power transmitted by the wireless power transmitter 200. The power reception unit 251 may receive power in the form of AC.

The controller 252 may control an overall operation of the wireless power receiver 250. The controller 252 may control the overall operation of the wireless power receiver 250 by using an algorithm, a program, or an application which is read from a storage 259 and is required for control. The controller 252 may be implemented in the form of a CPU, a microprocessor, a minicomputer, or the like.

The communication module 253 may communicate with the wireless power transmitter 200 by using a predetermined scheme. The communication module 253 may transmit power information to the wireless power transmitter 200. The power information may include at least one of battery residual quantity, the number of times of charging, usage, battery capacity, and battery charge/consumption ratio of the wireless power receiver 250.

Also, the communication module 253 may transmit a charging function control signal for controlling a charging function of the wireless power receiver 250. The charging function control signal is a control signal which controls the wireless power reception unit 251 of the particular wireless power receiver 250 to enable or disable the charging function of the particular wireless power receiver 250. Alternatively, as described in more detail below, the power information may include information on, for example, insertion of a wired charging terminal, transition from an SA mode to an NSA mode, release from an error situation, and the like. Also, the charging function control signal may include information related to the determination of a cross-connection. For example, the charging function control signal may include identification information, configuration information, and the like for determining the cross-connection, and may include pattern information or time information related to an impedance change of the wireless power receiver 250 for determining the cross-connection.

The controller 252 may control the display 258 to display the state of the wireless power receiver 250. Also, the controller 252 may display, on the display 258, an expected time period until the wireless power receiver 250 is completely charged.

Figure 3B:
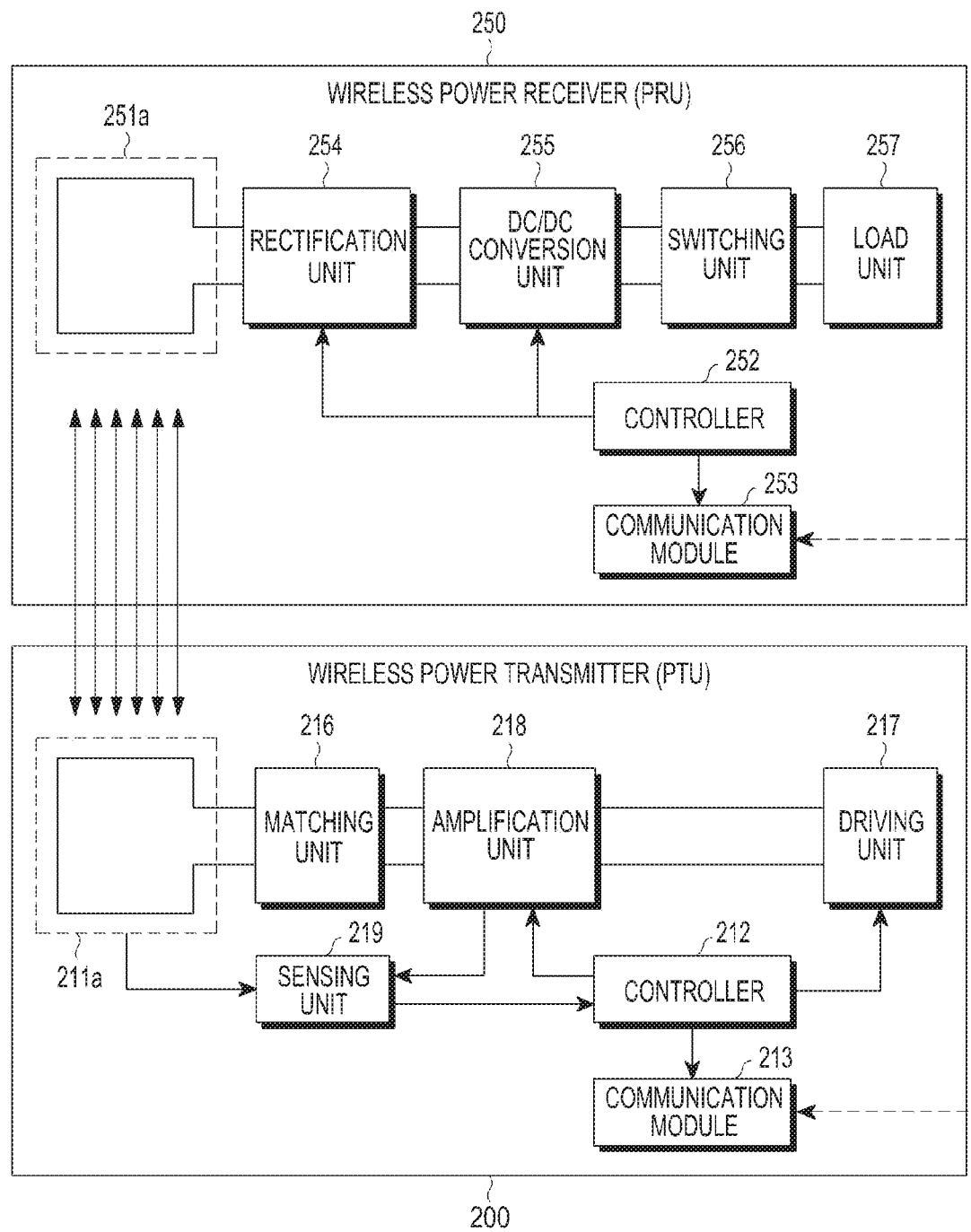
FIG. 3B is a block diagram of a wireless power transmitter and a wireless power receiver, according to an embodiment of the present disclosure.

FIG. 3B is a detailed block diagram of a wireless power transmitter and a wireless power receiver, according to an embodiment of the present disclosure.

Referring to FIG. 3B, the wireless power transmitter 200 and the wireless power receiver 250 are provided. The wireless power transmitter 200 includes at least one of a Tx resonator 211a, a controller (e.g., an MCU) 212, a communication module (e.g., an out-of-band signaling unit) 213, a driving unit (e.g., a power supply) 217, an amplification unit (e.g., a power amp) 218, a matching unit (e.g., a matching circuit) 216, and a sensing unit 219. The wireless power receiver 250 includes at least one of an Rx resonator 251a, a controller 252, a communication module 253, a rectification unit (e.g., a rectifier) 254, a DC/DC conversion unit 255, a switching unit (e.g., a switch) 256, and a load unit (e.g., a client device load) 257.

The driving unit 217 may output DC power having a preset voltage value. The voltage value of the DC power output by the driving unit 217 may be controlled by the controller 212.

A DC current output from the driving unit 217 may be output to the amplification unit 218. The amplification unit 218 may amplify the DC current by a preset gain. Also, the amplification unit 218 may convert DC power into AC power on the basis of a signal input from the controller 212. Accordingly, the amplification unit 218 may output AC power.

The matching unit 216 may perform impedance matching. For example, the matching unit 216 may adjust an impedance seen from the matching unit 216 and may control output power to have high efficiency or high output. The sensing unit 219 may sense an impedance change caused by the wireless power receiver 250 through the Tx resonator 211a or the amplification unit 218. A result of the sensing from the sensing unit 219 may be provided to the controller 212.

The matching unit 216 may adjust an impedance on the basis of the control of the controller 212. The matching unit 216 may include at least one of a coil and a capacitor. The controller 212 may control a connection state with at least one of the coil and the capacitor, and thereby may perform impedance matching.

The Tx resonator 211a may transmit input AC power to the Rx resonator 251a. The Tx resonator 211a and the Rx resonator 251a may be implemented by resonant circuits both having an identical resonance frequency. For example, the resonance frequency may be determined as 6.78 MHz. An inverter unit may convert DC power from the driving unit 217 to AC power, and may output the AC power to the Tx resonator 211a.

The communication module 213 of the wireless power transmitter 200 may communicate with the communication module 253 of the wireless power receiver 250, and may perform communication (e.g., Wi-Fi, ZigBee, bluetooth (BT), or bluetooth low energy (BLE)) at, for example, a bidirectional 2.4 GHz frequency.

The Rx resonator 251a may receive power for charging.

The rectification unit 254 may rectify wireless power that the Rx resonator 251a receives in the form of DC and may be implemented, for example, in the form of a diode bridge.

The DC/DC conversion unit 255 may convert the rectified power by a preset gain. For example, the DC/DC conversion unit 255 may convert the rectified power in such a manner that an output side has a voltage of 5 V. Minimum and maximum values of a voltage capable of being applied to a front end of the DC/DC conversion unit 255 may be preset.

The switching unit 256 may connect the DC/DC conversion unit 255 to the load unit 257. The switching unit 256 may maintain an on/off state according to the control of the controller 252. The switching unit 256 may be omitted. When the switching unit 256 is in an on-state, the load unit 257 may store the converted power which is input from the DC/DC conversion unit 255.

Throughout the disclosure, a reference to the execution of a particular operation by the wireless power transmitter 200 may imply that the controller 212 of the wireless power transmitter 200 performs the particular operation or may imply controlling another hardware element to perform the relevant operation. Likewise, a reference to the execution of a particular operation by the wireless power receiver 250 may imply that the controller 252 of the wireless power receiver 250 performs the particular operation or may imply controlling another hardware element to perform the relevant operation.

Figure 4:
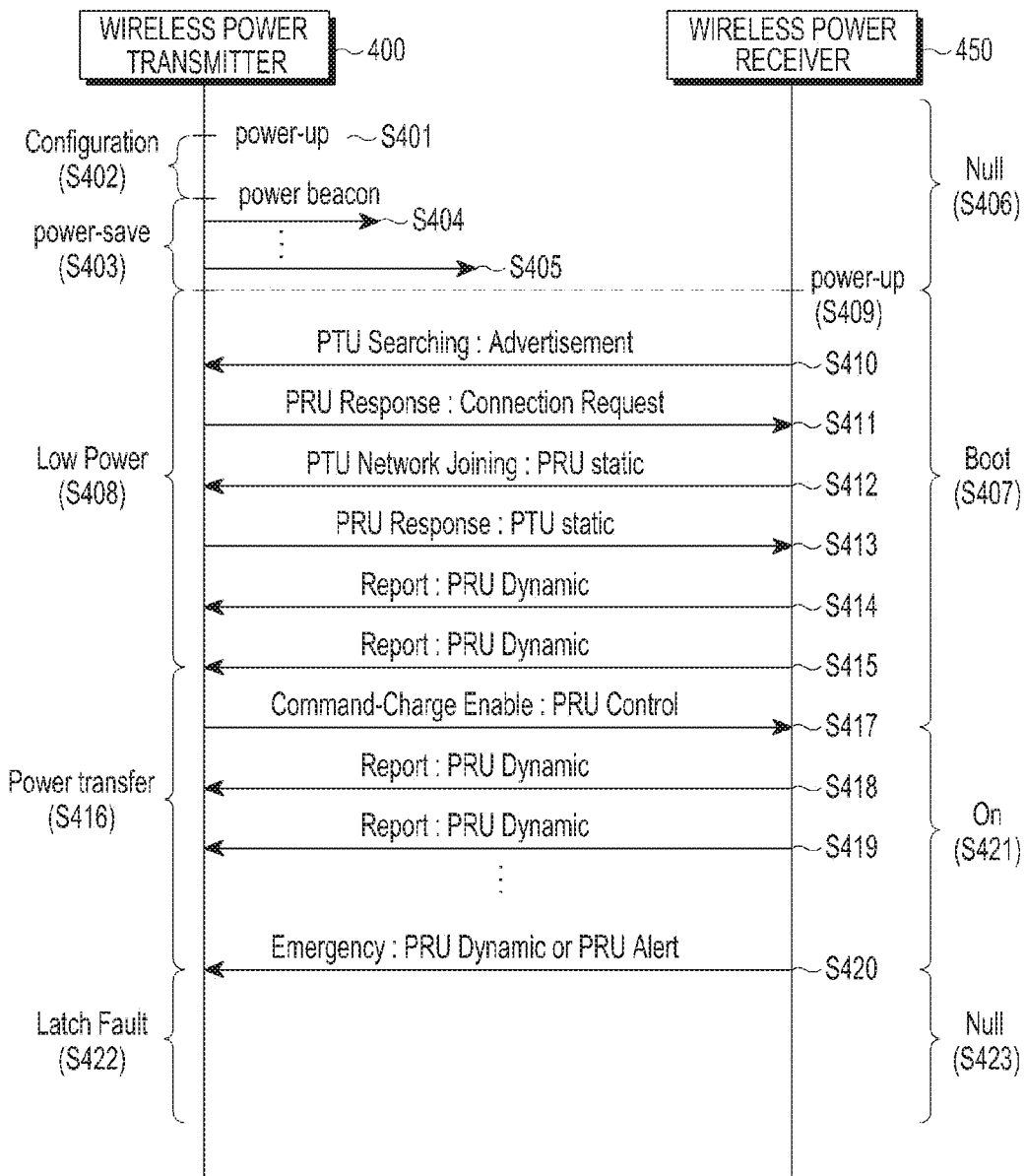
FIG. 4 is a signal flow diagram of a control method of a wireless power transmitter and a wireless power receiver, according to an embodiment of the present disclosure.

FIG. 4 is a signal flow diagram of a control method of a wireless power transmitter and a wireless power receiver, according to an embodiment of the present disclosure.

Referring to FIG. 4, a signal flow diagram for a method of a wireless power transmitter 400 and a wireless power receiver 450 is provided.

The wireless power transmitter 400 is powered on in step S401.

When the wireless power transmitter 400 is powered on, the wireless power transmitter 400 configures an environment in step S402.

The wireless power transmitter 400 enters a power save mode in step S403. In the power save mode, the wireless power transmitter 400 may apply different types of detection power beacons in respective cycles, and this configuration will be described in more detail with reference to FIG. 6.

For example, the wireless power transmitter 400 applies detection power beacons (e.g., short beacons or long beacons) in steps S404 and S405, and sizes of power values of the detection power beacons of steps S404 and S405 may be different. Some or all of the detection power beacons of steps S404 and S405 may have an amount of power which enables driving of the communication module of the wireless power receiver 450. For example, the wireless power receiver 450 may drive the communication module by using some or all of the detection power beacons of steps S404 and S405, and may communicate with the wireless power transmitter 400.

The above-described state, defined by steps S401 to S405 may be referred to as a null state, as shown in step S406.

The wireless power transmitter 400 may detect an impedance change due to the placement of the wireless power receiver 450. The wireless power transmitter 400 enters a low power mode in step S408. The low power mode will be described in more detail with reference to FIG. 6. The wireless power receiver 450 drives the communication module on the basis of power received from the wireless power transmitter 400, in step S409.

The wireless power receiver 450 transmits a wireless power transmitter (i.e., power transmitting unit (PTU)) searching signal to the wireless power transmitter 400 in step S410. The wireless power receiver 450 may transmit the PTU searching signal as a BLE-based advertisement (AD) signal. The wireless power receiver 450 may periodically transmit a PTU searching signal, and may transmit the PTU searching signal until the wireless power receiver 450 receives a response signal from the wireless power transmitter 400 or until a preset time period has passed.

When receiving the PTU searching signal from the wireless power receiver 450, the wireless power transmitter 400 transmits a wireless power receiver (i.e., power receiving unit (PRU)) response signal in step S411. The PRU response signal may establish a connection between the wireless power transmitter 400 and the wireless power receiver 400.

The wireless power receiver 450 transmits a PRU static signal in step S412. The PRU static signal is a signal indicating the state of the wireless power receiver 450, and may be used to request subscription to the wireless power network managed by the wireless power transmitter 400.

The wireless power transmitter 400 transmits a PTU static signal in step S413. The PTU static signal transmitted by the wireless power transmitter 400 is a signal indicating the capability of the wireless power transmitter 400.

When the wireless power transmitter 400 and the wireless power receiver 450 transmit and receive the PRU static signal and the PTU static signal, the wireless power receiver 450 periodically transmits a PRU dynamic signal in steps S414 and S415. The PRU dynamic signal may include at least one piece of parameter information measured by the wireless power receiver 450. For example, the PRU dynamic signal may include voltage information at the rear end of the rectification unit of the wireless power receiver 450.

The state of the wireless power receiver 450, as defined by steps S409 to S415, may be referred to as a boot state, as shown in step S407.

The wireless power transmitter 400 enters a power transmission mode in step S416, and transmits a PRU control signal, which is a command signal for allowing the wireless power receiver 450 to perform charging, in step S417. In the power transmission mode, the wireless power transmitter 400 transmits charging power.

The PRU control signal transmitted by the wireless power transmitter 400 may include information, which enables/disables charging of the wireless power receiver 450, and permission information. The PRU control signal may be transmitted whenever a charging state is changed. The PRU control signal may be transmitted, for example, every 250 ms, or may be transmitted when a parameter is changed. The PRU control signal may be set such that the PRU control signal needs to be transmitted within a preset threshold (e.g., 1 second) although the parameter is not changed.

The wireless power receiver 400 may change a configuration according to the PRU control signal and may transmit the PRU dynamic signal for reporting the state of the wireless power receiver 450, in steps S418 and S419. The PRU dynamic signal transmitted by the wireless power receiver 450 may include at least one piece of information among information on a voltage, a current, a state of the wireless power receiver, and a temperature thereof.

The state of the wireless power receiver 450, as defined by steps S417 to S419, may be referred to as an on-state, as shown in steps S421.

The PRU dynamic signal may have a data structure shown in Table 1 below.

TABLE 1

| Field | Octets | Description | Use | Units |
|---|---|---|---|---|
| Optional fields | 1 | Defines which optional fields are populated | mandatory | |
| Vrect | 2 | DC voltage at the output of the rectifier | mandatory | mV |
| Irect | 2 | DC current at the output of the rectifier | mandatory | mA |
| Vout | 2 | Voltage at charge/battery port | optional | mV |
| Iout | 2 | Current at charge/battery port | optional | mA |
| Temperature | 1 | Temperature of PRU | optional | Deg C. from −40 C. |
| Vrect min dyn | 2 | The current dynamic minimum rectifier voltage desired | optional | mV |
| Vrect set dyn | 2 | Desired Vrect (dynamic value) | optional | mV |
| Vrect high dyn | 2 | The current dynamic maximum rectifier voltage desired | optional | mV |

TABLE 1-continued

| Field | Octets | Description | Use | Units |
|---|---|---|---|---|
| PRU alert | 1 | Warnings | mandatory | Bit field |
| RFU | 3 | undefined | | |

As shown in Table 1, the PRU dynamic signal may include at least one field. The fields may have, configured therein, optional field information, voltage information (Vrect) at the rear end of the rectification unit of the wireless power receiver, current information (Irect) at the rear end of the rectification unit of the wireless power receiver, voltage information (Vout) at the rear end of the DC/DC conversion unit of the wireless power receiver, current information (Iout) at the rear end of the DC/DC conversion unit of the wireless power receiver, temperature information, minimum voltage value information (Vrect min dyn) at the rear end of the rectification unit of the wireless power receiver, optimal voltage value information (Vrect set dyn) at the rear end of the rectification unit of the wireless power receiver, maximum voltage value information (Vrect high dyn) at the rear end of the rectification unit of the wireless power receiver, and alert information (PRU alert). The PRU dynamic signal may include at least one of the above-described fields.

For example, one or more voltage setting values (e.g., the minimum voltage value information (Vrect min dyn) at the rear end of the rectification unit of the wireless power receiver, the optimal voltage value information (Vrect set dyn) at the rear end of the rectification unit of the wireless power receiver, the maximum voltage value information (Vrect high dyn) at the rear end of the rectification unit of the wireless power receiver, etc.) determined according to a charging state may be included in the respective fields, and may be transmitted in a state of being included in the respective fields. The wireless power transmitter that has received the PRU dynamic signal, as described above, may adjust a wireless charging voltage to be transmitted to each wireless power receiver with reference to the voltage setting values included in the PRU dynamic signal.

Among the fields, the alert information (PRU alert) may be formed in the data structure shown in Table 2 below.

TABLE 2

| 7 | 6 | 5 | 4 | 3 | 2 | 1 | 0 |
|---|---|---|---|---|---|---|---|
| Over-voltage | Over-current | Over-temperature | Charge Complete | TA detect | Transition | Restart request | RFU |

Referring to Table 2, the alert information (PRU alert) may include a bit for restart request, a bit for transition, and a bit for detecting insertion of a wired charging adapter (travel adapter (TA) detect). The charge complete bit, over-temperature bit, over-current bit, and over-voltage bit are included in the alert information. The charge complete bit indicates that charging of the battery is complete. The over-current bit indicates that the current at output of the rectifier is over a predetermined threshold. The over-voltage bit indicates that the voltage at output of the rectifier is over a predetermined threshold. The over-temperature bit indicates that the temperature is over a predetermined threshold. The TA detect represents a bit which allows the wireless power receiver to notify that a wired charging terminal is connected in the wireless power transmitter that provides wireless charging. The bit for transition represents a bit notifying the wireless power transmitter that the wireless power receiver is reset before a communication integrated circuit (IC) of the wireless power receiver transitions from the SA mode to the NSA mode. Lastly, the restart request represents a bit which allows the wireless power transmitter to notify the wireless power receiver that the wireless power transmitter is ready to resume charging when the wireless power transmitter has reduced transmission power due to the occurrence of an over-current state or an over-temperature state, has discontinued the charging, and returns to a normal state.

Alternatively, the alert information (PRU Alert) may be formed in the data structure shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU self-protection | Charge Complete | Wired Charger Detect | Mode Transition Bit 1 | Mode Transition Bit 0 |

Referring to Table 3, the alert information may include over-voltage, over-current, over-temperature, PRU self protection, charge complete, wired charger detect, mode transition, and the like. Here, when an over-voltage field is set to 1, the over-voltage field may indicate that Vrect in the wireless power receiver exceeds a limit of the over-voltage. Also, the over-current and the over-temperature may be set in a manner similar to that in the case of the over-voltage. Further, the PRU self protection indicates that the wireless power receiver protects itself by directly reducing power applied to a load. In this case, the wireless power transmitter does not need to change a charging state.

Bits for a mode transition may be set to a value for notifying the wireless power transmitter of a time period during which a mode transition procedure is performed. The bits indicating the mode transition time period may be expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4, "00" may indicate no mode transition, "01" may indicate that a time period required to complete a mode transition is a maximum of 2 seconds, "10" may indicate that a time period required to complete a mode transition is a maximum of 3 seconds, and "11" may indicate that a time period required to complete a mode transition is a maximum of 6 seconds.

For example, when 3 seconds or less are required to complete a mode transition, the mode transition bits may be set to "10." Before starting the mode transition procedure, the wireless power receiver may impose the restriction that no impedance change occurs during the mode transition procedure by changing an input impedance setting so as to match a 1.1 W power draw. Accordingly, the wireless power transmitter may adjust power ITX_COIL for the wireless power receiver according to this setting and, thus, may maintain the power ITX_COIL for the wireless power receiver during the mode transition time period.

Therefore, when a mode transition time period is set by the mode transition bits, the wireless power transmitter may maintain the power ITX_COIL for the wireless power receiver during the mode transition time period (e.g., 3 seconds). That is, although the wireless power transmitter does not receive a response from the wireless power receiver for 3 seconds, the wireless power transmitter may maintain a connection to the wireless power receiver. However, after the mode transition time period passes, the wireless power transmitter may regard the wireless power receiver as a rogue object and may terminate the power transmission.

The wireless power receiver 450 may detect the occurrence of an error. The wireless power receiver 450 may transmit an alert signal to the wireless power transmitter 400 in step S420. The alert signal may be transmitted as the PRU dynamic signal or a PRU alert signal. For example, the wireless power receiver 450 may reflect the error situation in the PRU alert field of Table 1 and may transmit the PRU alert field, in which the error situation is reflected, to the wireless power transmitter 400. Alternatively, the wireless power receiver 450 may transmit a single alert signal, which indicates the error situation, to the wireless power transmitter 400. When receiving the alert signal, the wireless power transmitter 400 may enter a latch fault mode in step S422. The wireless power receiver 450 may enter a null state in step S423.

Figure 5:
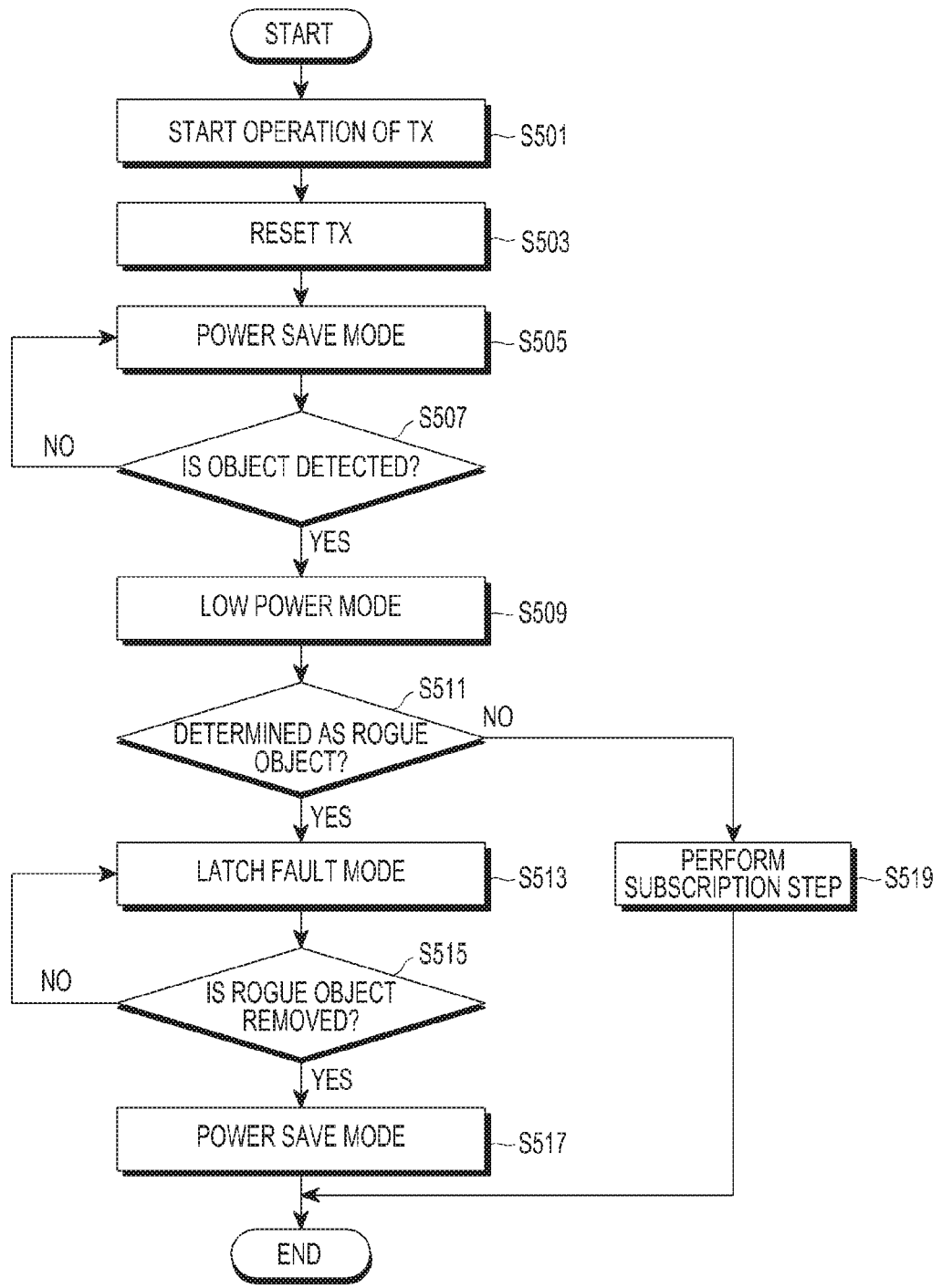
FIG. 5 is a flowchart of a control method of a wireless power transmitter and a wireless power receiver according to another embodiment of the present disclosure.
Figure 6:
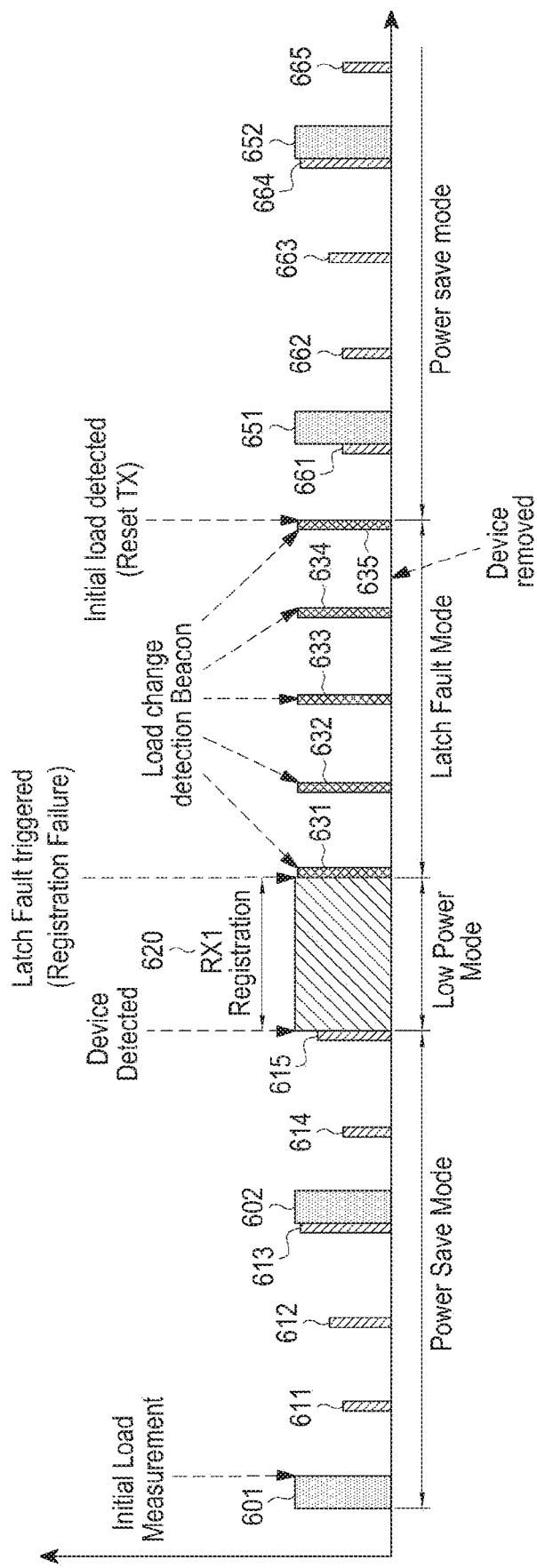
FIG. 6 is a graph of an amount of power applied by a wireless power transmitter on a time axis, according to an embodiment of the present disclosure.

FIG. 5 is a flowchart of a control method of a wireless power transmitter and a wireless power receiver according to another embodiment of the present disclosure. FIG. 6 is a graph of an amount of power applied by a wireless power transmitter on a time axis, according to an embodiment of the present disclosure. The control method described in FIG. 5 is described in further detail with reference to FIG. 6.

Referring to FIG. 5, the operation of the wireless power transmitter 200 begins in step S501. The wireless power transmitter 200 resets its initial configuration in step S503. The wireless power transmitter 200 enters a power save mode in step S505. The power save mode corresponds to a period during which the wireless power transmitter 200 applies different types of power having different power amounts to the power transmission unit 211. For example, the power save mode may correspond to a period during which the wireless power transmitter 200 may apply second detection power 601 and 602 and third detection power 611, 612, 613, 614, and 615 to the power transmission unit 211, as illustrated in FIG. 6. The wireless power transmitter 200 may periodically apply the second detection power 601 and 602 in a second cycle. When applying the second detection power 601 and 602, the wireless power transmitter 200 may apply the second detection power 601 and 602 during a second time period. The wireless power transmitter 200 may periodically apply the third detection power 611, 612, 613, 614, and 615 in a third cycle. When applying the third detection power 611, 612, 613, 614, and 615, the wireless power transmitter 200 may apply the third detection power 611, 612, 613, 614, and 615 during a third time period. Although it is illustrated that power values of the third detection power 611, 612, 613, 614, and 615 are different, the power values of the third detection power 611, 612, 613, 614, and 615 may be different or identical.

After outputting the third detection power 611, the wireless power transmitter 200 may output the third detection power 612 having a power amount identical to that of the third detection power 611. When the wireless power transmitter 200 outputs the third detection power 611 and 612, both having the identical power amount as described above, the third detection power may have a power amount which enables the detection of the smallest wireless power receiver 250, for example, a wireless power receiver of category 1.

In contrast, after outputting the third detection power 611, the wireless power transmitter 200 may output the third detection power 612 having a power amount different from that of the third detection power 611. When the wireless power transmitter 200 outputs the third detection power 612 having a power amount different from that of the third detection power 611 as described above, the third detection power may have respective power amounts which enable the detection of wireless power receivers 250 of categories 1 to 5. For example, the third detection power 611 may have a power amount which enables the detection of a wireless power receiver of category 5. The third detection power 612 may have a power amount which enables the detection of a wireless power receiver 250 of category 3. The third detection power 613 may have a power amount which enables the detection of a wireless power receiver 250 of category 1.

The second detection power 601 and 602 is power which can drive the wireless power receiver 250. More specifically, the second detection power 601 and 602 may have power amounts which can drive the controller 252 and/or the communication module 253 of the wireless power receiver 250.

The wireless power transmitter 200 may apply the second detection power 601 and 602 and the third detection power 611, 612, 613, 614, and 615 to the power reception unit 251 in second and third cycles, respectively. When the wireless power receiver 250 is placed on the wireless power transmitter 200, an impedance seen from a point of the wireless power transmitter 200 may be changed. While applying the second detection power 601 and 602 and the third detection power 611, 612, 613, 614, and 615, the wireless power transmitter 200 may detect an impedance change. For example, while applying the third detection power 615, the wireless power transmitter 200 may detect the impedance change. Accordingly, the wireless power transmitter 200 detects an object in step S507. When no object has been detected, the wireless power transmitter 200 maintains the power save mode, in which different types of power are periodically applied, in step S505.

In contrast, when the impedance has been changed and, thus, the object has been detected, the wireless power transmitter 200 may enter a low power mode. The low power mode is a mode in which the wireless power transmitter 200 may apply driving power having a power amount which can drive the controller 252 and/or communication module 253 of the wireless power receiver 250. For example, in FIG. 6, the wireless power transmitter 200 may apply driving power 620 to the power transmission unit 211. The wireless power receiver 250 may receive the driving power 620 and may drive the controller 252 and/or the communication module 253 with the received driving power 620. The wireless power receiver 250 may communicate with the wireless power transmitter 200 according to a predetermined scheme on the basis of the driving power 620. For example, the wireless power receiver 250 may transmit/receive data required for authentication, and may subscribe to the wireless power network that the wireless power transmitter 200 manages on the basis of the transmission/reception of the data. However, when a rogue object other than the wireless power receiver 250 is placed on the wireless power transmitter 200, the data transmission/reception may not be performed. Accordingly, the wireless power transmitter 200 determines whether the placed object is a rogue object, in step S511. For example, when the wireless power transmitter 200 does not receive a response from the object during a preset time period, the wireless power transmitter 200 may determine that the object is a rogue object.

When the object is determined as the rogue object, the wireless power transmitter 200 enters the latch fault mode in step S513. In contrast, when it is determined that the object is not the rogue object, a subscription step is performed in step S519. For example, the wireless power transmitter 200 may periodically apply first power 631 to 634, as illustrated in FIG. 6 in a first cycle. While applying the first power, the wireless power transmitter 200 may detect an impedance change. For example, when the rogue object has been removed, the wireless power transmitter 200 may detect an impedance change, and may determine that the rogue object has been removed. In contrast, when the rogue object has not been removed, the wireless power transmitter 200 may not detect the impedance change, and may determine that the rogue object has not been removed. When the rogue object has not been removed, the wireless power transmitter 200 may output at least one of lamp light and an alert sound, and thereby may notify the user that the wireless power transmitter 200 is currently in an error state. Accordingly, the wireless power transmitter 200 may include an output unit that outputs at least one of the lamp light and the alert sound.

When it is determined that the rogue object has not been removed, the wireless power transmitter 200 maintains the latch fault mode in step S513. In contrast, when it is determined that the rogue object has been removed, the wireless power transmitter 200 re-enters the power save mode in step S517. For example, the wireless power transmitter 200 may apply second power 651 and 652, and third power 661 to 665, as illustrated in FIG. 6.

As described above, when the rogue object other than the wireless power receiver 250 is placed, the wireless power transmitter 200 may enter the latch fault mode. In the latch fault mode, the wireless power transmitter 200 may determine whether the rogue object has been removed on the basis of an impedance change which is based on applied power. That is, a latch fault mode entry condition, as described with respect to FIGS. 5 and 6, may be the placement of a rogue object. The wireless power transmitter 200 may have various latch fault mode entry conditions in addition to the placement of a rogue object. For example, the wireless power transmitter 200 may be cross-connected to a wireless power receiver 250 placed on another wireless power transmitter. In this case, the wireless power transmitter 200 may also enter the latch fault mode.

Accordingly, when the wireless power transmitter 200 is cross-connected to a wireless power receiver 250, the wireless power transmitter 200 is required to return to the initial state, and the wireless power receiver 250 is required to be removed. The wireless power transmitter 200 may set a cross-connection, which corresponds to the subscription of a wireless power receiver 250 placed on another wireless power transmitter in a wireless power network, as a latch fault mode entry condition. An operation of the wireless power transmitter 200 in the case of an occurrence of a cross-connection error will be described with reference to FIG. 7.

Figure 7:
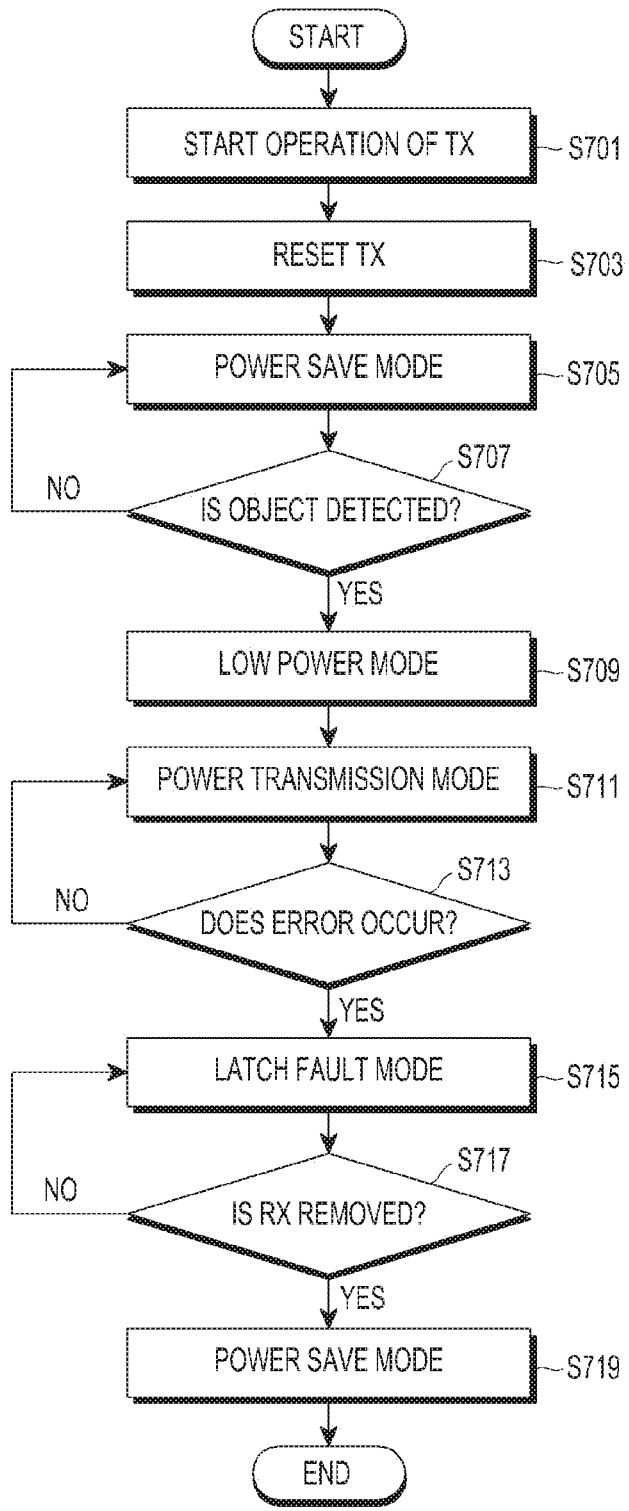
FIG. 7 is a flowchart of a control method of a wireless power transmitter, according to an embodiment of the present disclosure.
Figure 8:
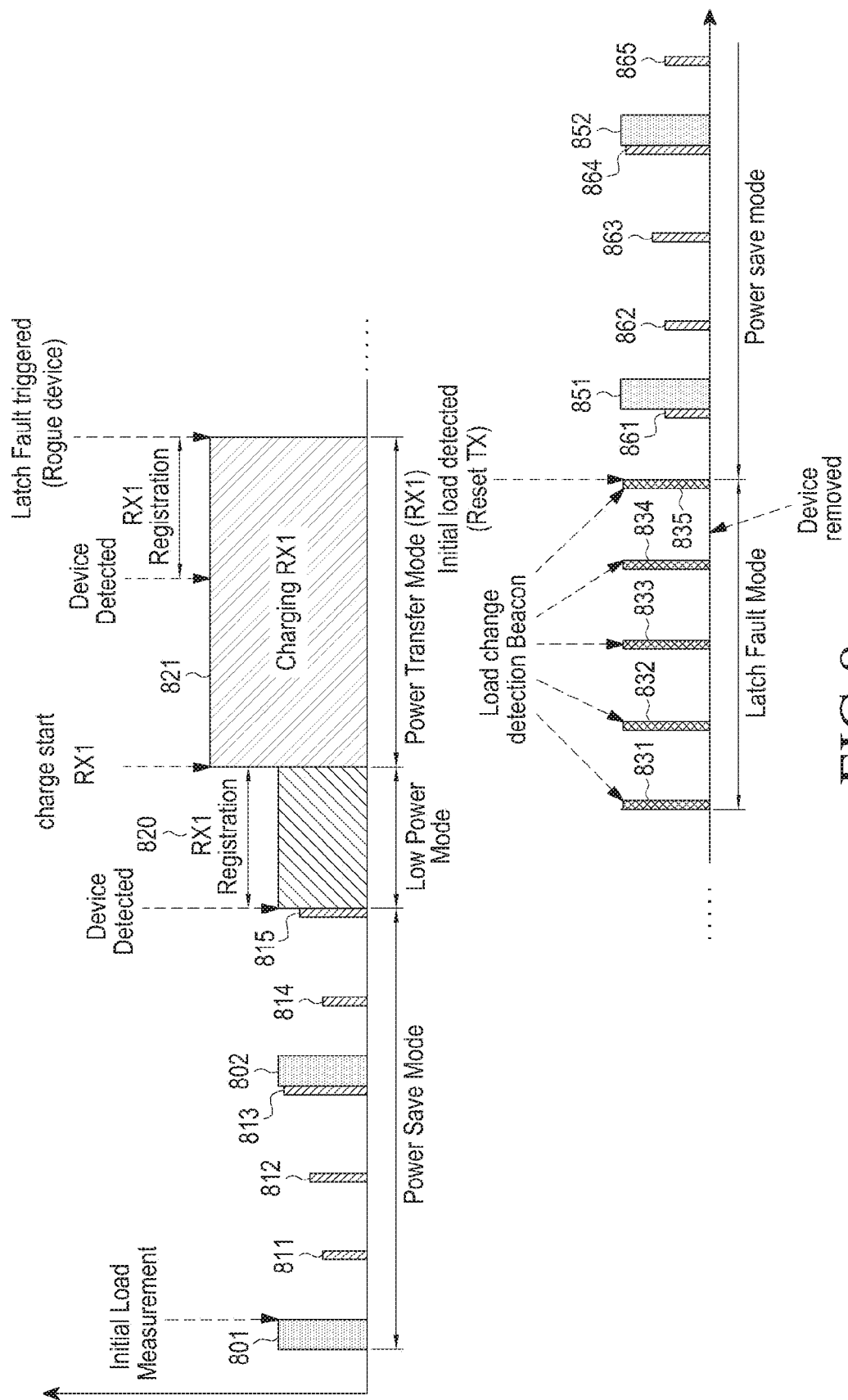
FIG. 8 is a graph of an amount of power applied by a wireless power transmitter on a time axis based on a control method of a wireless power transmitter, according to an embodiment of the present disclosure.

FIG. 7 is a flowchart of a control method of a wireless power transmitter, according to an embodiment of the present disclosure. FIG. 8 is a graph of an amount of power applied by a wireless power transmitter on a time axis based on a control method of a wireless power transmitter, according to an embodiment of the present disclosure. The control method described in FIG. 7 is described in further detail with reference to FIG. 8.

Referring to FIG. 7, the operation of the wireless power transmitter 200 begins in step S701. The wireless power transmitter resets its initial configuration in step S703. The wireless power transmitter 200 enters a power save mode in step S705. The power save mode corresponds to a period during which the wireless power transmitter 200 applies different types of power having different power amounts to the power transmission unit 211. For example, the power save mode may correspond to a period during which the wireless power transmitter 200 may apply second detection power 801 and 802 and third detection power 811, 812, 813, 814, and 815 to the power transmission unit 211, as illustrated in FIG. 8. The wireless power transmitter 200 may periodically apply the second detection power 801 and 802 in a second cycle. When applying the second detection power 801 and 802, the wireless power transmitter 200 may apply the second detection power 801 and 802 during a second time period. The wireless power transmitter 200 may periodically apply the third detection power 811, 812, 813, 814, and 815 in a third cycle. When applying the third detection power 811, 812, 813, 814, and 815, the wireless power transmitter 200 may apply the third detection power 811, 812, 813, 814, and 815 during a third time period. Although it is illustrated that power values of the third detection power 811, 812, 813, 814, and 815 are different, the power values of the third detection power 811, 812, 813, 814, and 815 may be different or identical.

The second detection power 801 and 802 is power which can drive the wireless power receiver 250. More specifically, the second detection power 801 and 802 may have power amounts which can drive the controller 252 and/or the communication module 253 of the wireless power receiver 250.

The wireless power transmitter 250 may apply the second detection power 801 and 802 and the third detection power 811, 812, 813, 814, and 815 to the power reception unit 251 in second and third cycles, respectively. When the wireless power receiver 250 is placed on the wireless power transmitter 200, an impedance seen from a point of the wireless power transmitter may be changed. While applying the second detection power 801 and 802 and the third detection power 811, 812, 813, 814, and 815, the wireless power transmitter 200 may detect an impedance change. For example, while applying the third detection power 815, the wireless power transmitter 200 may detect the impedance change. Accordingly, the wireless power transmitter 200 detects an object in step S707. When no object has been detected, the wireless power transmitter 200 maintains the power save mode, in which different types of power are periodically applied, in step S705.

In contrast, when the impedance has been changed and, thus, the object has been detected, the wireless power transmitter 200 enters a low power mode in step S709. The low power mode is a mode in which the wireless power transmitter 200 may apply driving power having a power amount which can drive the controller 252 and/or the communication module 253 of the wireless power receiver 250. For example, in FIG. 8, the wireless power transmitter 200 may apply driving power 820 to the power transmission unit 211. The wireless power receiver 250 may receive the driving power 820 and may drive the controller 252 and/or the communication module 253 with the received driving power 820. The wireless power receiver 250 may communicate with the wireless power transmitter 200 according to a predetermined scheme on the basis of the driving power 820. For example, the wireless power receiver 250 may transmit/receive data required for authentication, and may subscribe to the wireless power network that the wireless power transmitter manages on the basis of the transmission/reception of the data.

Then, the wireless power transmitter 200 enters the power transmission mode, in which charging power is transmitted, in step S711. For example, the wireless power transmitter 200 may apply charging power 821 and the charging power may be transmitted to the wireless power receiver 250, as illustrated in FIG. 8.

In the power transmission mode, the wireless power transmitter 200 may determine whether an error has occurred. Here, the error may be the placement of a rogue object on the wireless power transmitter, cross-connection, over-voltage, over-current, over-temperature, and the like. The wireless power transmitter 200 may include a sensing unit capable of measuring the over-voltage, the over-current, the over-temperature, and the like. For example, the wireless power transmitter 200 may measure a voltage or a current at a reference point, and may determine a case where the measured voltage or current exceeds a threshold as satisfying an over-voltage condition or an over-current condition. Alternatively, the wireless power transmitter 200 may include a temperature sensing means, and the temperature sensing means may measure a temperature at a reference point of the wireless power transmitter 200. When the temperature at the reference point exceeds the threshold, the wireless power transmitter 200 may determine that an over-temperature condition is satisfied.

When an over-voltage state, an over-current state, or an over-temperature state is determined according to the measurement value of the temperature, voltage, or current, the wireless power transmitter 200 prevents the over-voltage, over-current, or over-temperature by reducing the wireless charging power by a preset value. When a voltage value of the reduced wireless charging power becomes less than a set minimum value (e.g., the minimum voltage value information (Vrect min dyn) at the rear end of the rectification unit of the wireless power receiver 250), the wireless charging is stopped and, thus, the voltage setting value may be readjusted.

Although the additional placement of a rogue object on the wireless power transmitter 200 is described as an error with respect to FIGS. 7 and 8, the error is not limited thereto, and it will be readily understood by those skilled in the art that the wireless power transmitter 200 may operate according to a similar process with respect to placement of a rogue object, cross-connection, over-voltage, over-current, and over-temperature.

When no error has occurred, the wireless power transmitter 200 maintains the power transmission mode in step S711. In contrast, when the error has occurred, the wireless power transmitter 200 enters a latch fault mode in step S715. For example, the wireless power transmitter 200 may apply first power 831 to 835, as illustrated in FIG. 8. Also, the wireless power transmitter 200 may output an error occurrence notification including at least one of lamp light and an alert sound during the latch fault mode. When it is determined that the rogue object or the wireless power receiver has not been removed, the wireless power transmitter 200 maintains the latch fault mode in step S715. In contrast, when it is determined that the rogue object or the wireless power receiver 250 has been removed, the wireless power transmitter 200 re-enters the power save mode in step S719. For example, the wireless power transmitter 200 may apply second power 851 and 852, and third power 861 to 865, as illustrated in FIG. 8.

Accordingly, the operation of the wireless power transmitter 200 in the case of an occurrence of an error during the transmission of charging power has been described. Hereinafter, a description will be made of an operation of the wireless power transmitter 200 in a case where multiple wireless power receivers 250 placed on the wireless power transmitter 200 receive charging power from the wireless power transmitter 200.

Figure 9:
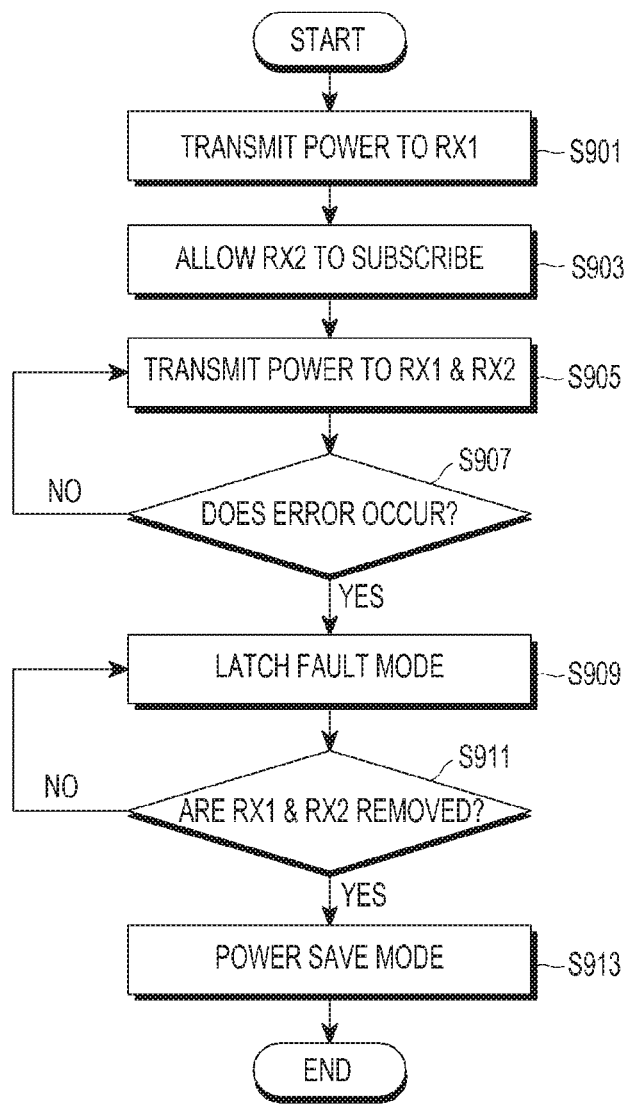
FIG. 9 is a flowchart of a control method of a wireless power transmitter, according to an embodiment of the present disclosure.
Figure 10:
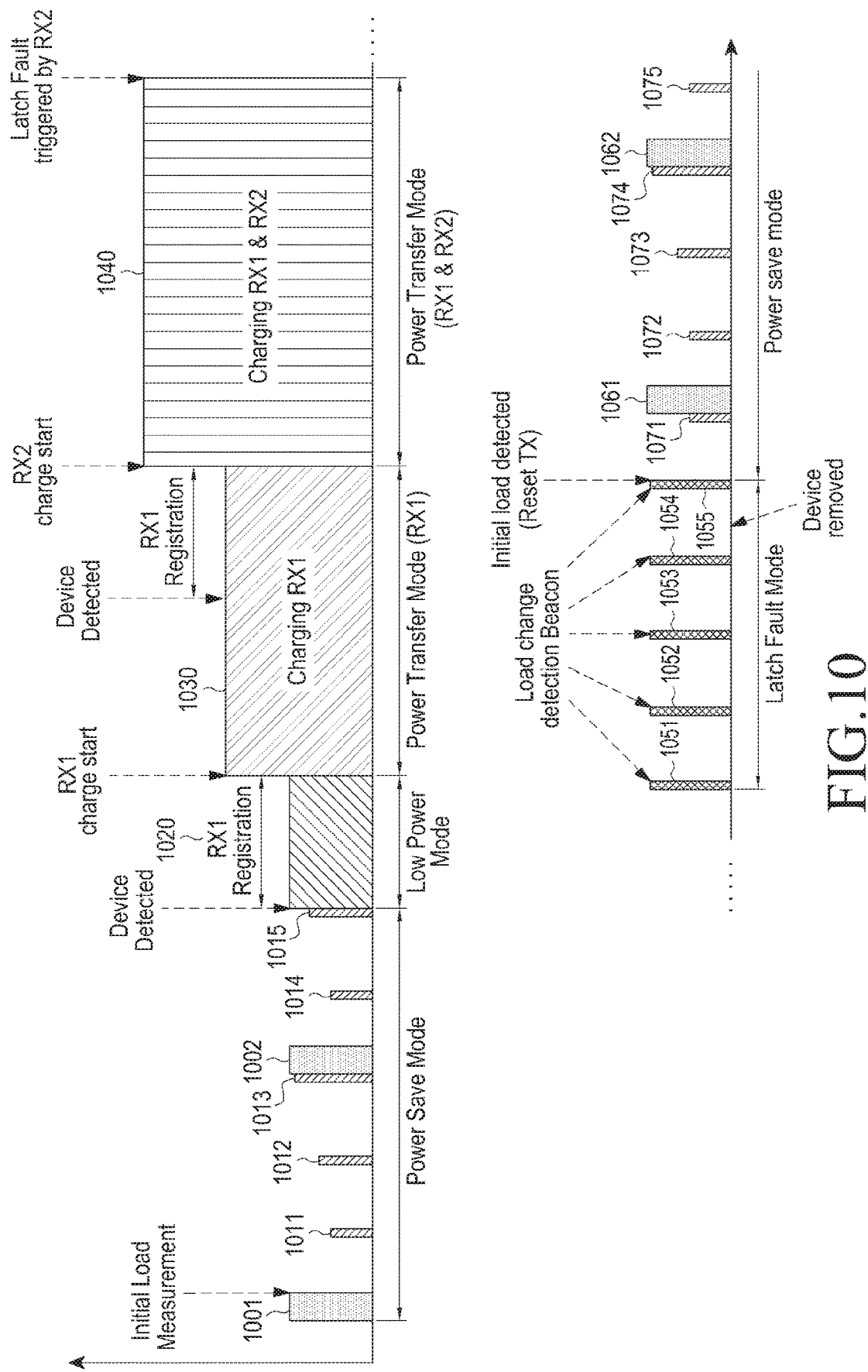
FIG. 10 is a graph of an amount of power applied by a wireless power transmitter on a time axis, based on a control method of a wireless power transmitter, according to an embodiment of the present disclosure.

FIG. 9 is a flowchart of a control method of a wireless power transmitter, according to an embodiment of the present disclosure. FIG. 10 is a graph of an amount of power applied by a wireless power transmitter on a time axis, based on a control method of a wireless power transmitter, according to an embodiment of the present disclosure. The control method described in FIG. 9 is described in further detail with reference to FIG. 10.

Referring to FIG. 9, the wireless power transmitter 200 transmits charging power to a first wireless power receiver 110-1 in step S901. The wireless power transmitter 200 additionally allows a second wireless power receiver 110-2 to subscribe to the wireless power network in step S903. Further, the wireless power transmitter transmits charging power to the second wireless power receiver 110-2 in step S905. More specifically, the wireless power transmitter 200 may apply the sum of the charging power required by the first wireless power receiver 110-1 and the charging power required by the second wireless power receiver 110-2 to power reception units of the first and second wireless power receivers 110-1 and 110-2.

Referring to FIG. 10, steps S901 to S905 of FIG. 9 are illustrated. For example, the wireless power transmitter 200 may maintain the power save mode in which the wireless power transmitter 200 applies second detection power 1001 and 1002 and third detection power 1011 to 1015. Then, the wireless power transmitter 200 may detect the first wireless power receiver 110-1, and may enter the low power mode in which the wireless power transmitter 200 maintains detection power 1020. Next, the wireless power transmitter 200 may enter the power transmission mode in which the wireless power transmitter 200 applies first charging power 1030. The wireless power transmitter 200 may detect the second wireless power receiver 110-2, and may allow the second wireless power receiver 110-2 to subscribe to the wireless power network. Also, the wireless power transmitter 200 may apply second charging power 1040 having a power amount which is the sum of power amounts required by the first and second wireless power receivers 110-1 and 110-2.

Referring again to FIG. 9, while transmitting charging power to both the first and second wireless power receivers 110-1 and 110-2 in step S905, the wireless power transmitter 200 detects the occurrence of an error in step S907. As described above, the error may be the placement of a rogue object, cross-connection, over-voltage, over-current, over-temperature, and the like. When no error has occurred, the wireless power transmitter 200 maintains the application of the second charging power 1040.

In contrast, when the error has occurred, the wireless power transmitter 200 enters the latch fault mode in step S909. For example, the wireless power transmitter 200 may apply first power 1051 to 1055 in a first cycle, as illustrated in FIG. 10. The wireless power transmitter 200 determines whether both the first and second wireless power receivers 110-1 and 110-2 have been removed, in step S911. For example, the wireless power transmitter 200 may detect an impedance change while applying the first power 1051 to 1055. The wireless power transmitter 200 may determine whether both the first and second wireless power receivers 110-1 and 110-2 have been removed, on the basis of whether the impedance has returned to the initial value.

When it is determined that both the first and second wireless power receivers 110-1 and 110-2 have been removed, the wireless power transmitter 200 enters the power save mode in step S913. For example, the wireless power transmitter 200 may apply second detection power 1061 and 1062 and third detection power 1071 to 1075 in second and third cycles, respectively, as illustrated in FIG. 10.

As described above, even when the wireless power transmitter 200 applies charging power to multiple wireless power receivers, in the case of the occurrence of an error, the wireless power transmitter 200 may easily determine whether a wireless power receiver or a rogue object has been removed.

Figure 11:
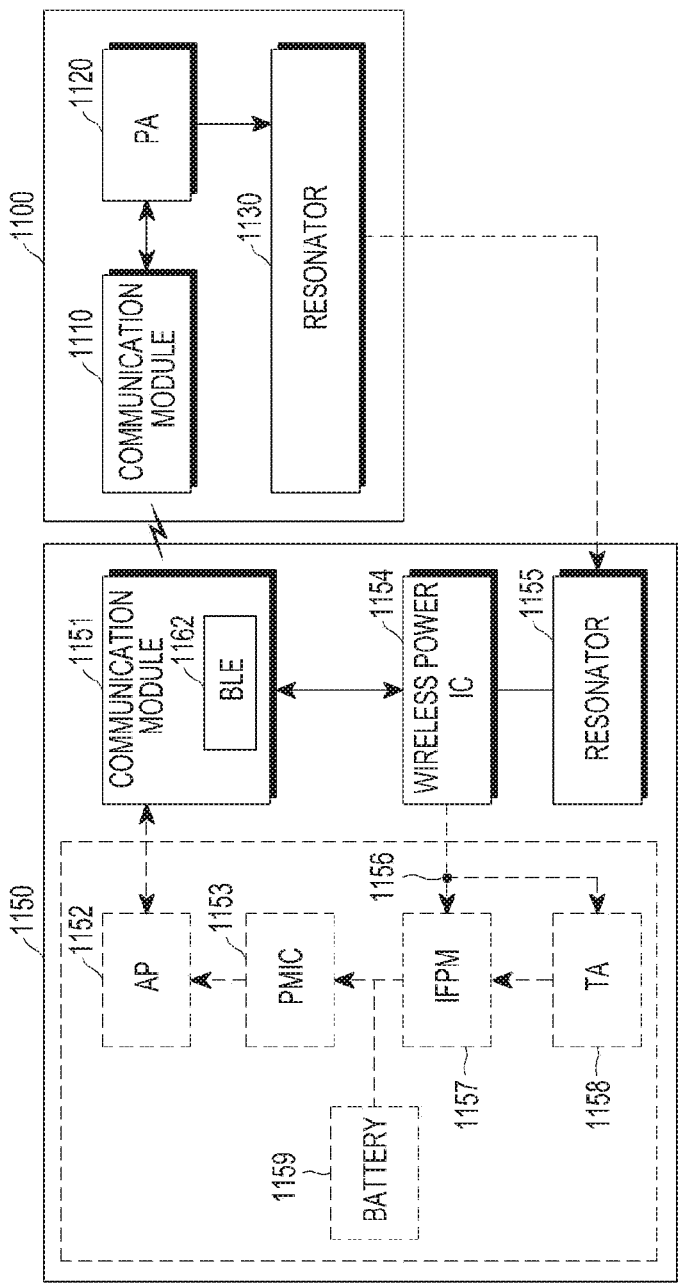
FIG. 11 is a block diagram of a wireless power transmitter and a wireless power receiver in a stand-alone (SA) mode, according to an embodiment of the present disclosure.

FIG. 11 is a block diagram of a wireless power transmitter and a wireless power receiver in an SA mode, according to an embodiment of the present disclosure.

Referring to FIG. 11, a wireless power transmitter 1100 and a wireless power receiver 1150 is provided. The wireless power transmitter 1100 includes a communication module 1110, a power amplifier (PA) 1120, and a resonator 1130. The wireless power receiver 1150 may include a communication module (e.g., a wireless power transfer (WPT) communication IC) 1151, an application processor (AP) 1152, a power management integrated circuit (PMIC) 1153, a wireless power integrated circuit (WPIC) 1154, a resonator 1155, an interface power management IC (IFPM) 1157, a TA 1158, and a battery 1159.

The communication module 1110 may be implemented by a Wi-Fi/BT combination IC, and may communicate with the communication module 1151 in a predetermined communication scheme (e.g., a BLE scheme). For example, the communication module 1151 of the wireless power receiver 1150 may transmit a PRU dynamic signal having the data structure shown in Table 1 to the communication module 1110 of the wireless power transmitter 1100. As described above, the PRU dynamic signal may include at least one piece of information among voltage information, current information, temperature information, and alert information of the wireless power receiver 1150.

The value of power which is output from the PA 1120 may be adjusted on the basis of the received PRU dynamic signal.

For example, when the over-voltage, over-current, or over-temperature is applied to the wireless power receiver 1150, the value of a power output from the PA 1120 may be reduced. Also, when a voltage or current of the wireless power receiver 1150 has a value less than a preset value, the value of power output from the PA 1120 may be increased.

Charging power from the resonator 1130 may be wirelessly transmitted to the resonator 1155.

The WPIC 1154 may rectify the charging power received from the resonator 1155 and may perform DC/DC conversion on the rectified charging power. The WPIC 1154 may drive the communication module 1151 or may charge the battery 1159 with the converted power.

A wired charging terminal may be inserted into the TA 1158. A wired charging terminal, such as a 30-pin connector, a universal serial bus (USB) connector, or the like, may be inserted into the TA 1158, and the TA 1158 may receive power supplied from an external power source and may charge the battery 1159 with the received power.

The IFPM 1157 may process the power received from the wired charging terminal and may output the processed power to the battery 1159 and the PMIC 1153.

The PMIC 1153 may manage power received wirelessly or by wire and power applied to each element of the wireless power receiver 1150. The AP 1152 may receive power information from the PMIC 1153 and control the communication module 1151 to transmit a PRU dynamic signal for reporting the power information.

A node 1156 connected to the WPIC 1154 may also be connected to the TA 1158. When a wired charging connector is inserted into the TA 1158, a preset voltage (e.g., 5 V) may be applied to the node 1156. The WPIC 1154 may monitor the voltage applied to the node 1156, and thereby may determine whether the TA is inserted.

The AP 1152 has a stack of a predetermined communication scheme, for example, a Wi-Fi/BT/BLE stack. Accordingly, when communication for wireless charging is performed, the communication module 1151 may load the stack from the AP 1152, and may then communicate with the communication module 1110 of the wireless power transmitter 1100 by using a BT or BLE communication scheme on the basis of the stack.

However, there may occur a state in which data for transmitting wireless power cannot be fetched from the AP 1152 in a power-off state of the AP 1152 or a state in which power becomes too small to maintain an on-state of the AP 1152 during fetching the data from a memory of the AP 1152 and using the fetched data.

When the residual power amount of the battery 1159 is less than a minimum power threshold as described above, the AP 1152 may be turned off and the battery 1159 may be wirelessly charged by using some elements (e.g., the communication module 1151, the WPIC 1154, the resonator 1155, etc.) for wireless charging disposed in the wireless power receiver 1150. A state in which a sufficient amount of power to turn on the AP 1152 cannot be supplied is referred to as a "dead battery state."

Because the AP 1152 is not driven in the dead battery state, the communication module 1151 may not receive the stack of the predetermined communication scheme, for example, the Wi-Fi/BT/BLE stack, from the AP 1152. In preparation for this case, a part of the stack of the predetermined communication scheme, for example, the BLE stack, may be fetched from the AP 1152 and may be stored in a memory 1162 of the communication module 1151. Accordingly, the communication module 1151 may communicate with the wireless power transmitter 1100 for wireless charging by using the stack (i.e., a wireless charging protocol) of the communication scheme stored in the memory 1162. In the present example, the communication module 1151 may include an internal memory, and the BLE stack may be stored in a memory in the form of a read only memory (ROM) in the SA mode.

As described above, a mode in which the communication module 1151 performs communication by using the stack of the communication scheme stored in the memory 1162 is referred to as the SA mode. Accordingly, the communication module 1151 may manage the charging procedure on the basis of the BLE stack.

Figure 12:
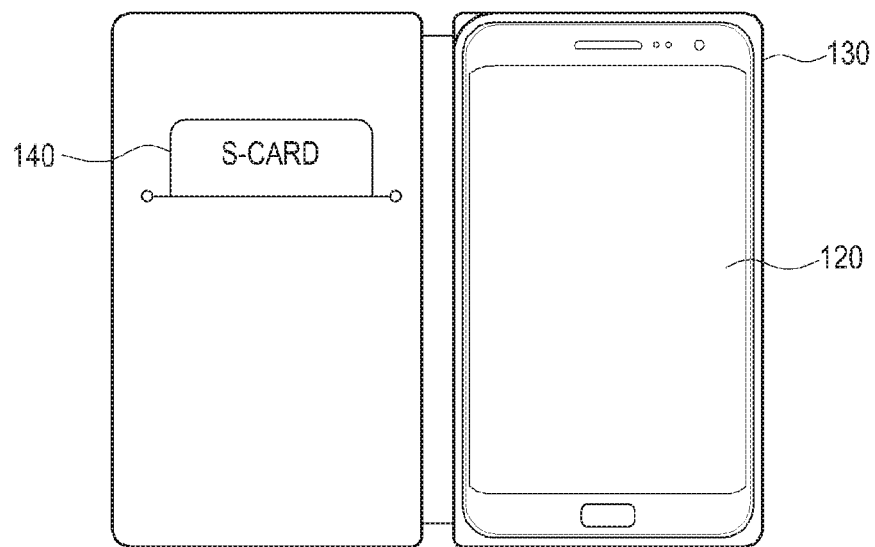
FIG. 12 is a diagram of a wireless power receiver and an external NFC tag, according to various embodiments of the present disclosure.

FIG. 12 is a diagram of a wireless power receiver and an external NFC tag, according to various embodiments of the present disclosure.

Referring to FIG. 12, a case 130 capable of holding a wireless power receiver 120 taking the form of, for example, a smart phone, is illustrated. Typically, the case 130 provides not only a structure capable of holding the wireless power receiver 120, but also a structure capable of holding a credit card 140. The credit card 140 may include an NFC tag.

A user may keep the wireless power receiver 120 and the credit card 140 in the case 130 together, and the case 130 may be placed on the wireless power transmitter 100. In this case, the NFC tag within the credit card 140, may be placed on the wireless power transmitter 100. As described above, when the wireless power transmitter 100 generates an electromagnetic wave for charging, the NFC tag within the credit card 140 may be destroyed.

Figure 13:
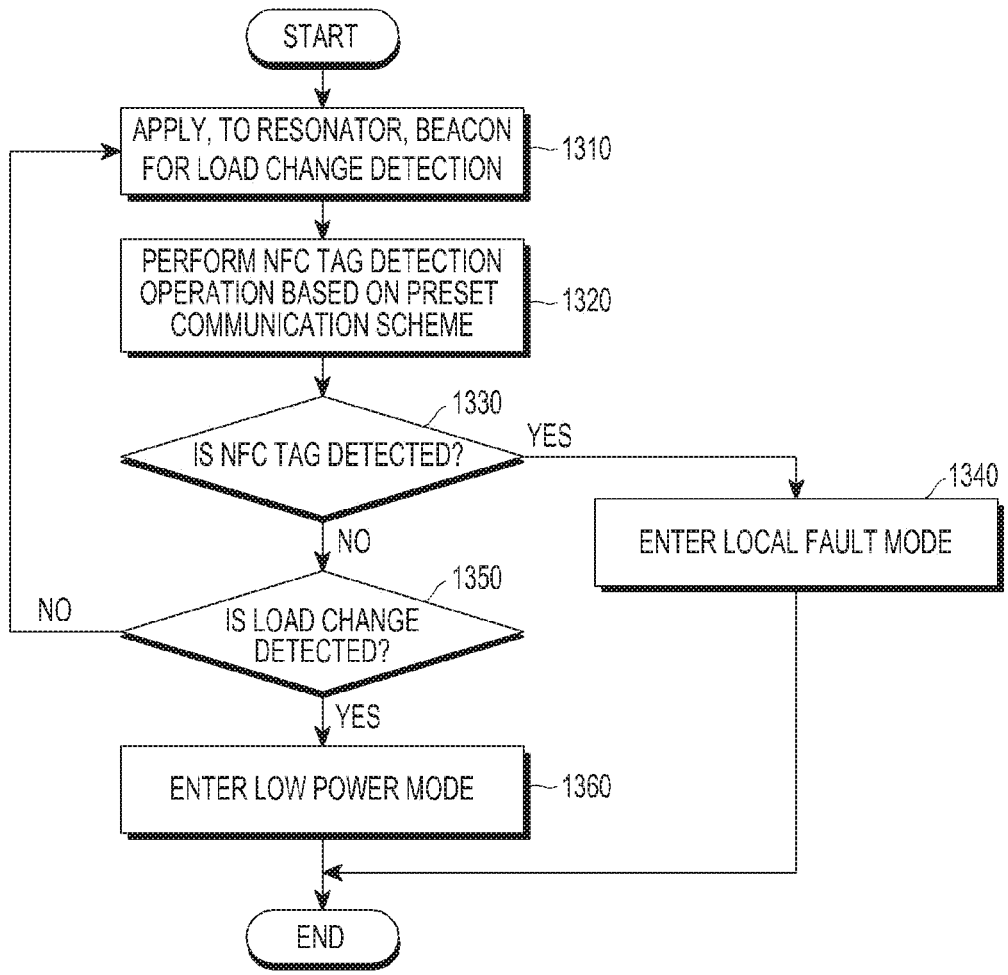
FIG. 13 is a flowchart of a control method of a wireless power transmitter, according to an embodiment of the present disclosure.

FIG. 13 is a flowchart of a control method of a wireless power transmitter, according to an embodiment of the present disclosure.

Referring to FIG. 13, in step 1310, the wireless power transmitter 200 applies, to the Tx resonator 211a, a beacon for impedance change detection. For example, the wireless power transmitter 200 may apply detection power, such as the detection power 611 illustrated in FIG. 6.

Referring to FIG. 13, in step 1320, the wireless power transmitter performs an NFC tag detection operation which is based on a preset communication scheme. For example, the wireless power transmitter 200 may operate in an NFC reader mode. The wireless power transmitter 200 may transmit a radio wave capable of being received by the NFC tag, and may detect a radio wave fed back from the NFC tag.

In step 1330, the wireless power transmitter 200 determines whether the NFC tag has been detected. For example, the wireless power transmitter 200 may detect a feedback radio wave from the NFC tag, as described above. Accordingly, the wireless power transmitter 200 may determine whether the NFC tag is detected, on the basis of whether the feedback radio wave has been received. Alternatively, the wireless power transmitter 200 may interpret information included in an additionally-received feedback radio wave, may confirm whether the received radio wave is a radio wave from the NFC tag, and may thereby determine whether the NFC tag is detected.

When it is determined that the NFC tag has been detected, in step 1340, the wireless power transmitter 200 enters a local fault mode. In the local fault mode, the wireless power transmitter 200 does not apply a beacon, namely, detection power, to the Tx resonator 211a. In the local fault mode, the wireless power transmitter 200 may perform an NFC tag detection operation. The wireless power transmitter 200 may operate in an NFC reader mode at preset intervals. For example, until it is determined that the NFC tag has been removed, the wireless power transmitter 200 may perform an NFC tag detection operation in the local fault mode. That is, a condition for a transition from the local fault mode to another mode may be the removal of the NFC tag or failure to detect the NFC tag. In this case, the wireless power transmitter 200 may enter a power save mode from the local fault mode. After the wireless power transmitter 200 enters a PTU configuration mode from the local fault mode, the wireless power transmitter 200 may confirm the removal of an NFC tag, and may enter the power save mode. The wireless power transmitter 200 may enter a latch fault mode.

The wireless power transmitter 200 may output an indication that a user can recognize.

When it is determined that no NFC tag has been detected, in step 1350, the wireless power transmitter 200 determines whether an impedance change is detected. For example, the wireless power transmitter 200 may determine whether an impedance of the Tx resonator 211a is changed during a beacon application time period. As described above, when the impedance of the Tx resonator 211a has been changed, the wireless power transmitter 200 may determine that a wireless power receiver 250 has been detected. Alternatively or additionally, when a time point of changing the impedance of the Tx resonator 211a is close enough to a time point of receiving an advertisement signal, the wireless power transmitter 200 may determine that the wireless power receiver 250 is placed.

When the impedance change has been detected, in step 1360, the wireless power transmitter 200 enters a low power mode, and applies driving power, such as the driving power 620 illustrated in FIG. 6, to the Tx resonator 211a. The driving power may have, for example, enough magnitude to wake up a communication module 253 and/or controller 252 of the wireless power receiver 250.

Figure 14A:
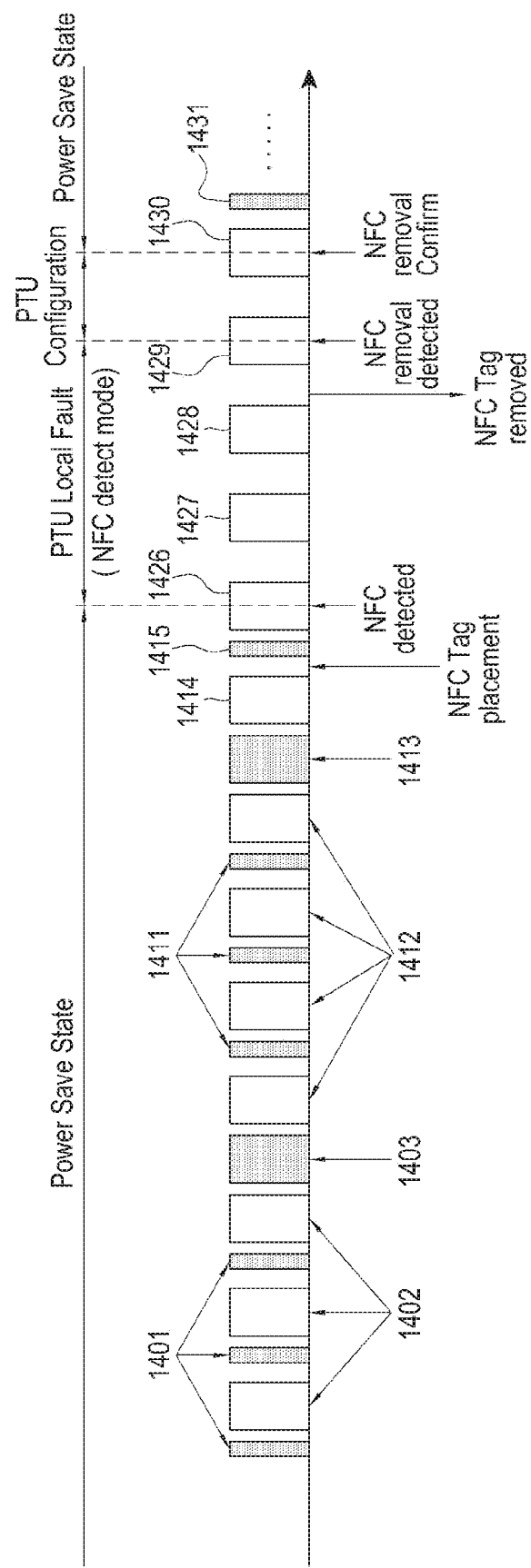
FIG. 14A illustrates a control method of a wireless power transmitter applying power to a resonator and an NFC antenna of the wireless power transmitter, according to an embodiment of the present disclosure.
Figure 14B:
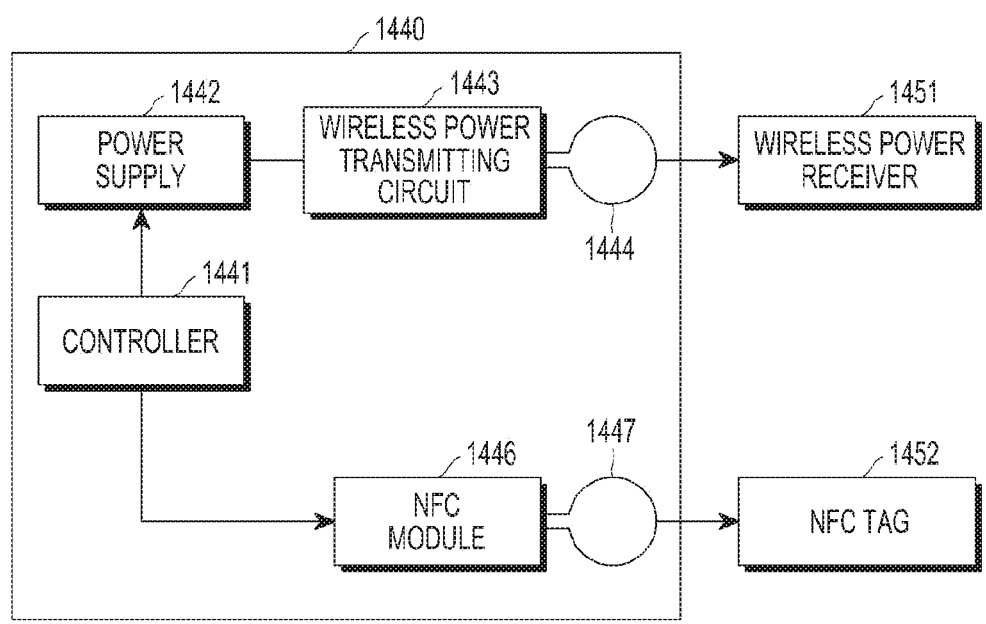
FIG. 14B illustrates a block diagram of a wireless power transmitter according to an embodiment of the present disclosure.
Figure 14C:
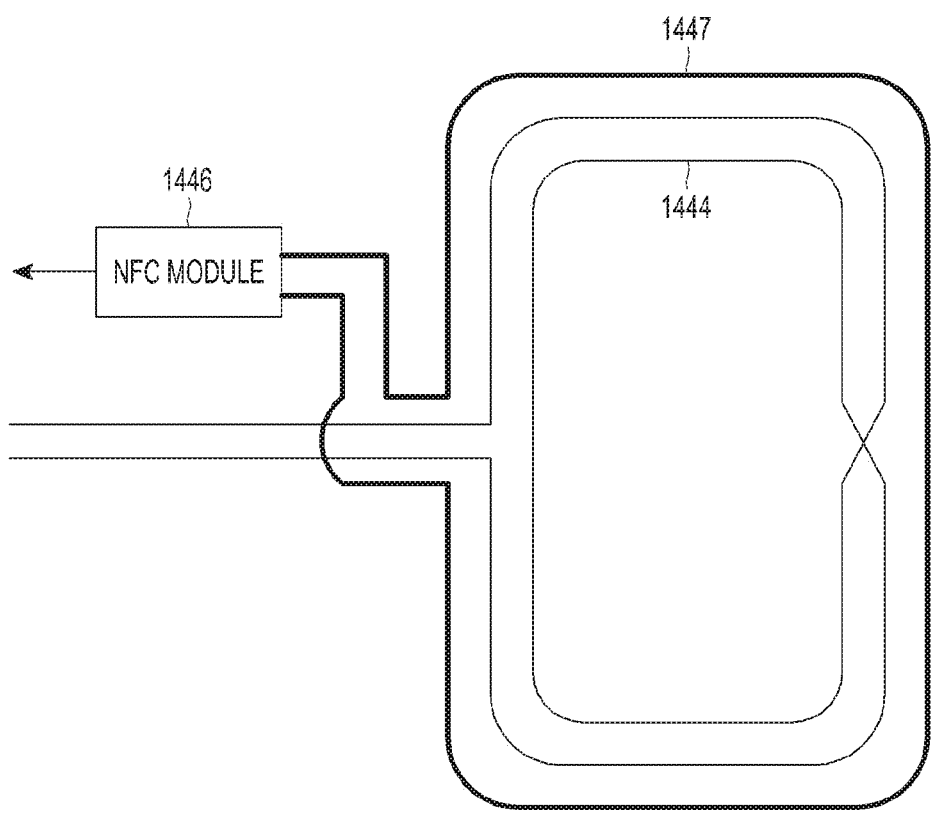
FIG. 14C illustrates an arrangement of coils according to an embodiment of the present disclosure.

FIG. 14A illustrates a control method of a wireless power transmitter applying power to a resonator and an NFC antenna of the wireless power transmitter, according to an embodiment of the present disclosure. FIG. 14B illustrates a block diagram of a wireless power transmitter according to an embodiment of the present disclosure. FIG. 14C illustrates an arrangement of coils according to an embodiment of the present disclosure.

Referring to FIGS. 14A and 14B, the wireless power transmitter 1440 (e.g. the wireless power transmitter 200) may apply a beacon power 1401 for impedance change detection to the Tx resonator 1444 in a first cycle. More specifically, the controller 1441 may control at least one of the power supply 1442 and the wireless power transmitting circuit 1443 to apply the beacon power 1401 to the TX resonator 1444 through the wireless power transmitting circuit 1443. The wireless power transmitting circuit 1443 may include an amplifier or matching unit.

Referring to FIG. 14C, the TX resonator 1444 may be disposed inside the NFC antenna 1447. By detecting the impedance change while applying the beacon power 1401, the controller may detect the wireless power receiver 1451. The wireless power transmitter 1440 may apply power 1402 for NFC tag detection to the NFC antenna 1447 in a second cycle. More specifically, the controller 1441 may control the NFC module 1446 to apply the power 1402 for NFC tag detection to the NFC antenna 1447. According to one embodiment, one power supply may provide beacon power 1401 and power 1402 to the Tx resonator 1444 and the NFC antenna 1447 respectively. According to another embodiment, each of two different power supplies may provide beacon power 1401 and power 1402 to the Tx resonator 1444 and the NFC antenna 1447 respectively. The NFC module 1446 may include a circuit for generating an NFC signal and processing a received signal. When the power 1402 for NFC tag detection is applied to the NFC antenna 1447, the NFC antenna 1447 may generate a radio wave to be transmitted to the NFC tag 1452. Here, the first and second cycles may be identical or different. The wireless power transmitter 1440 may apply the beacon power 1401 to the Tx resonator 1444, and may apply the power 1402 for NFC tag detection to the NFC antenna 1447 after a preset time period. That is, the wireless power transmitter 200 may alternately apply the beacon power 1401 and the power 1402. In the power save mode, not only the application of a beacon power and a long beacon power to the Tx resonator 1444, but also an NFC tag detection operation, for example, the application of power 1402 for NFC tag detection to the NFC antenna, may be performed. Although it is illustrated that the magnitude of the beacon power 1401 is identical to that of the power 1402 for NFC tag detection, this configuration is for convenience of description only, and thus, the magnitude of the beacon power 1401 may be different from that of the power 1402 for NFC tag detection.

The wireless power transmitter 1440 may replace the beacon power 1401 by a long beacon power 1403, and may apply the long beacon power 1403 to the Tx resonator 1444. The long beacon power 1403 is for inducing enough voltage to elicit a response from a wireless power receiver 1451. That is, the wireless power transmitter 1440 may apply the long beacon power 1403 and the beacon power 1401 in such a manner as to mix the long beacon power 1403 with the beacon power 1401. Although the magnitude of the beacon power 1401 is illustrated as being constant in FIG. 14A, this configuration is for illustrative purposes only, and thus, the magnitude of the beacon power 1401 may be changed. For example, the magnitude of the first beacon power 1401 may be greater or less than that of the second beacon power 1401. When the wireless power transmitter 1440 does not detect the impedance change or the NFC tag, the wireless power transmitter 1440 may continuously apply beacon powers 1411 and 1415 and a long beacon power 1413 to the Tx resonator 1444, and may continuously apply power 1412 and 1414 for NFC tag detection to the NFC antenna 1447.

In the case where, after the wireless power transmitter 1440 applies the power 1414 for NFC tag detection, an NFC tag is placed within a charging range of the wireless power transmitter 1440, the wireless power transmitter 1440 may detect an NFC tag during a time period for applying power 1426 for NFC tag detection. More specifically, the wireless power transmitter 1440 may receive a feedback radio wave from the NFC tag, and accordingly, may detect the NFC tag. As described above, the wireless power transmitter 1440 may enter a local fault mode from the power save mode. The local fault mode may be referred to as an "NFC detection mode."

In the local fault mode, the wireless power transmitter 1440 may perform an NFC tag detection operation or an NFC tag removal operation. For example, the wireless power transmitter 1440 may apply power 1427, 1428, and 1429 for NFC tag detection to the NFC antenna 1447 in a preset second cycle. When the NFC tag has not been removed, the wireless power transmitter 1440 may receive a feedback radio wave from the NFC tag. When the NFC tag has been removed, the wireless power transmitter 1440 may not receive the feedback radio wave. In the case where the NFC tag is removed after a time point of applying the power 1428 for NFC tag detection, the wireless power transmitter 1440 does not receive a particular feedback radio wave while the wireless power transmitter 1440 applies the power 1429 for NFC tag detection to the NFC antenna. Accordingly, the wireless power transmitter 1440 may determine that the NFC tag has been removed. The wireless power transmitter 1440 may enter a PTU configuration mode, may re-apply power 1430 for NFC tag detection and may reconfirm the removal of the NFC tag, and may then enter the power save mode. The wireless power transmitter 1440 may re-apply a beacon power 1431 to the Tx resonator 211*a*, and may perform an NFC tag detection.

The Tx resonator 1444 and the NFC antenna 1447 may be implemented as one hardware or two different hardware. According to one embodiment, one resonator may receive each of beacon power 1401 and power 1402 and transmit magnetic fields each corresponding to each of beacon power 1401 and power 1402. According to another embodiment, each of two different resonators may receive each of beacon power 1401 and power 1402 and transmit magnetic fields each corresponding to each of beacon power 1401 and power 1402.

Figure 15:
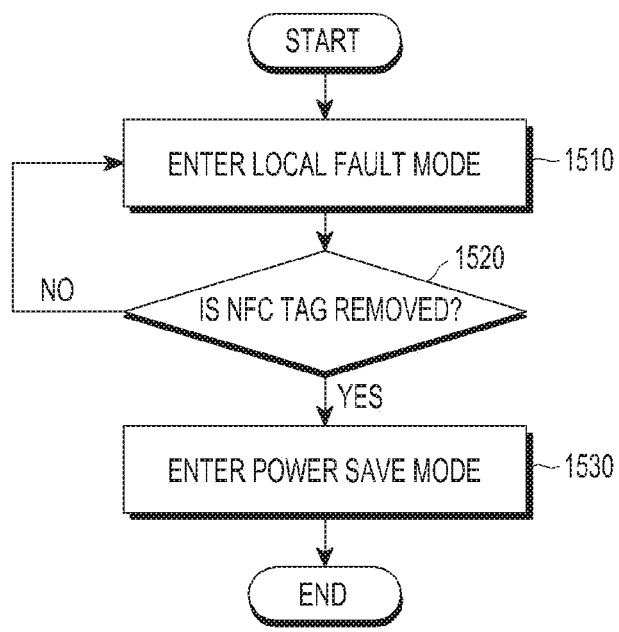
FIG. 15 is a flowchart of a control method of a wireless power transmitter, according to an embodiment of the present disclosure.

FIG. 15 is a flowchart of a control method of a wireless power transmitter, according to an embodiment of the present disclosure.

Referring to FIG. 15, in step 1510, the wireless power transmitter 200 enters a local fault mode in response to the detection of an NFC tag. In step 1520, the wireless power transmitter 200 determines whether the NFC tag has been removed. As described above, the wireless power transmitter 200 may perform an NFC tag removal detection operation in the local fault mode. The wireless power transmitter 200 may apply power for NFC tag detection to the NFC antenna, and may detect the removal of the NFC tag on the basis of not receiving a feedback radio wave from the NFC tag.

In step 1530, the wireless power transmitter 200 enters a power save mode. Alternatively or additionally, the wireless power transmitter 200 may first enter a PTU configuration mode from a local fault mode, may reconfirm the removal of the NFC tag in the PTU configuration mode, and may enter the power save mode in response to the reconfirmation.

Figure 16:
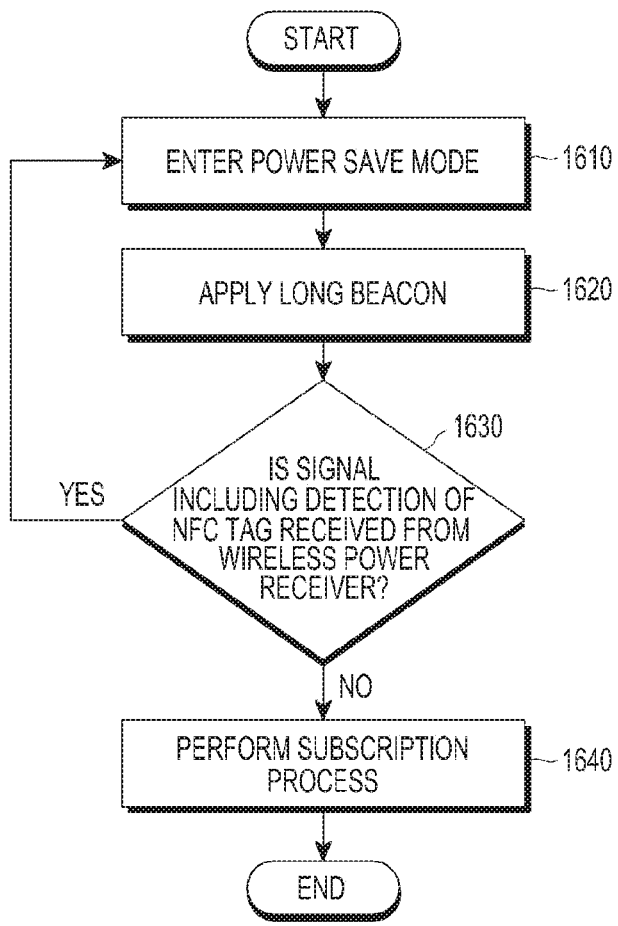
FIG. 16 is a flowchart of a control method of a wireless power transmitter, according to an embodiment of the present disclosure.

FIG. 16 is a flowchart of a control method of a wireless power transmitter, according to an embodiment of the present disclosure.

Referring to FIG. 16, in step 1610, the wireless power transmitter 200 enters a power save mode. In step 1620, the wireless power transmitter 200 may apply a long beacon power. As described above, the long beacon power of the wireless power transmitter 200 is for inducing enough voltage to elicit a response from a wireless power receiver 250. When the long beacon power is applied to the Tx resonator 211*a*, the Tx resonator 211*a* may form an electromagnetic wave by using the long beacon power and may wirelessly deliver power to the wireless power receiver 250.

The wireless power receiver 250 may wake up the communication module 253 by using the long beacon power, namely, by using the electromagnetic wave formed by the long beacon power. Alternatively, the communication module 253 may have already been woken up before receiving the long beacon power. The wireless power receiver 250 may operate in an NFC reader mode in response to the reception of the long beacon power. When the wireless power receiver 250 has previously been set to an NFC tag mode, the wireless power receiver 250 may perform a mode transition from the NFC tag mode to the NFC reader mode, in response to the reception of the long beacon power. Accordingly, the wireless power receiver may also detect a nearby NFC tag. When an external NFC tag has been detected, the wireless power receiver 250 may transmit a communication signal, which indicates the detection of the NFC tag, to the wireless power transmitter 200.

In step 1630, the wireless power transmitter 200 determines whether the wireless power transmitter 200 has received a signal including the detection of an NFC tag from the wireless power receiver 250. When the signal including the detection of the NFC tag has been received, the wireless power transmitter 200 may detect an NFC tag in the power save mode. When the NFC tag has been detected in the power save mode, the wireless power transmitter 200 may enter a local fault mode. Alternatively, the wireless power transmitter 200 may enter a latch fault mode.

When the signal including the detection of the NFC tag has not been received, in step 1640, the wireless power transmitter 200 performs a subscription process. For example, the wireless power transmitter 200 may perform the subscription process, such as the transmission of a PRU response signal corresponding to an advertisement signal, the transmission of a PTU static signal, and the like.

Figure 17:
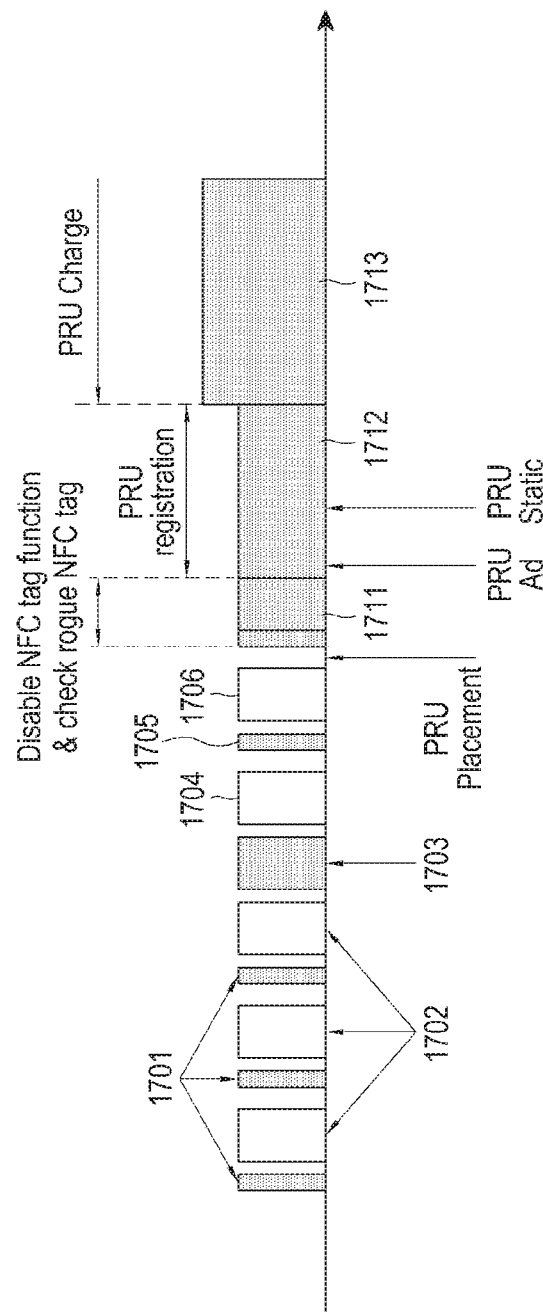
FIG. 17 illustrates a magnitude of power applied by a wireless power transmitter, according to an embodiment of the present disclosure.

FIG. 17 illustrates a magnitude of power applied by a wireless power transmitter, according to an embodiment of the present disclosure.

Referring to FIG. 17, the wireless power transmitter 200 may apply beacon powers 1701 and 1705 to the Tx resonator 211*a*, and may apply power 1702, 1704, and 1706 for NFC tag detection to the NFC antenna. The wireless power transmitter 200 may also apply a long beacon power 1703 to the Tx resonator 211*a*. For example, after the power 1706 for NFC tag detection is applied, the wireless power receiver 250 may be placed on the wireless power transmitter 200. While the wireless power transmitter 200 applies a long beacon power 1711, the wireless power transmitter 200 may detect an impedance change and may detect the placement of the wireless power receiver 250. The wireless power transmitter 200 may receive an advertisement signal (i.e., PRU Ad) from the wireless power receiver 250 and may perform a subscription process (i.e., PRU registration). In this case, the wireless power transmitter 200 may apply detection power 1712 to the Tx resonator 211*a*. Meanwhile, while the wireless power receiver 250 disables an NFC tag function, the wireless power receiver 250 may determine whether an external NFC tag (i.e., a rogue NFC tag) is placed around the wireless power receiver 250. The wireless power receiver 250 may transmit, to the wireless power transmitter 200, an advertisement signal including information on whether an NFC tag has been detected.

When, by using the advertisement signal, the wireless power transmitter 200 confirms the information indicating that no NFC tag has been detected, the wireless power transmitter 200 may perform a subscription (i.e., PRU registration) while applying the detection power 1712, and may transmit, for example, a PTU static signal. Also, when a signal indicating that no NFC tag has been detected is continuously received in a subsequent process, the wireless power transmitter 200 may enter a charging step (PRU charge) after going through the subscription process, and may apply charging power 1713 to the Tx resonator 211*a*. Alternatively, when the wireless power receiver 250 detects an NFC tag, the wireless power receiver 250 may transmit, to the wireless power transmitter 200, an advertisement signal which indicates stopping the transmission of power.

When the wireless power transmitter 200 has received an advertisement signal indicating the detection of the NFC, the wireless power transmitter 200 may re-detect an NFC tag in a power save mode. When the NFC tag has been detected as a result of re-detecting the NFC tag, the wireless power transmitter 200 may enter a local fault mode.

Table 5 illustrates an example of an advertisement signal.

TABLE 5

| Flags AD type | Service Data AD Type | | | Airfuel AD type |
|---|---|---|---|---|
| Flags | WPT service 16-bit UUID | GATT Primary Service Handle | PRU RSSI Parameter | ADV Flags ADV extension |

The advertisement signal may have an Airfuel AD type field added thereto, and the Airfuel AD type field may include NFC detection-related information. For example, Table 6 illustrates an example of specific sub-fields of the Airfuel AD type field shown in Table 5.

TABLE 6

| 7 | 6 | 5 | 4 | 3 | 2 | 1 | 0 |
|---|---|---|---|---|---|---|---|
| NFC Protected | RFU | RFU | RFU | RFU | RFU | RFU | RFU |

As shown in Table 6, information on NFC Protected may be entered in a seventh field. The NFC Protected signifies that an NFC circuit is protected. For example, an NFC circuit may be included within the wireless power receiver 250, and the NFC circuit within the wireless power receiver 250 may be designed to be protected from wireless charging. Meanwhile, as described above, an NFC circuit, such as a credit card disposed outside the wireless power receiver 250, cannot be protected from wireless charging. Accordingly, when a flag of NFC Protected represents 1, the flag of 1 may indicate that no external NFC tag has been detected around the wireless power receiver 250. In contrast, when the flag of NFC Protected represents 0, the flag of 0 may indicate that the external NFC tag has been detected around the wireless power receiver 250. When the wireless power transmitter 200 receives an advertisement signal of which the flag of NFC Protected is 0, the wireless power transmitter 200 may re-detect an NFC tag in the power save mode. When the wireless power transmitter 200 receives an advertisement signal of which the flag of NFC Protected is 1, the wireless power transmitter 200 may perform a subscription process and a charging process. Meanwhile, those skilled in the art will easily understand that the position of the flag of NFC Protected within the advertisement signal is not limited. For example, NFC tag detection-related information may be included in a field numbered 3 of a BT generic access profile of an existing advertisement signal.

Meanwhile, an external NFC tag may be designed to be robust against power from the wireless power transmitter 200. That is, the external NFC tag may be designed to be protected from wireless charging. The wireless power receiver 250 may detect that an NFC tag detected around the wireless power receiver 250 is designed to be protected from wireless charging. For example, the wireless power receiver 250 may perform NFC communication with the external NFC tag, and may receive, from the external NFC tag, information on whether the external NFC tag is designed to be protected from wireless charging. When it is determined that the external NFC tag is designed to be protected from wireless charging, the wireless power receiver 250 may transmit an advertisement signal of which a flag of NFC Protected is 1. In this case, the wireless power transmitter 200 may perform wireless charging in response to the flag of NFC Protected having the value of 1. The external NFC tag is also designed to be protected from wireless charging, and thus is not affected by the wireless charging.

As described above, the wireless power receiver 250 may detect an NFC tag even during a charging process, and accordingly, may transmit information on the detection of the NFC tag to the wireless power transmitter 200 by using a signal other than an advertisement signal.

The wireless power receiver 250 may include information on the detection of the NFC tag in a PRU static signal. Table 7 illustrates an example of a PRU static signal.

TABLE 7

| 7 | 6 | 5 | 4 | 3 | 2 | 1 | 0 |
|---|---|---|---|---|---|---|---|
| NFC receiver | | Power Control Algorithm Preference | Adjust power capability | charge complete connected mode | PTU test mode | RFU | RFU |
| 00 = Not supported 01 = Unaffected NFC 10 = Affected NFC 11 = Reserved | | 0 = VRECT_MIN_ERROR 1 = MAX System Efficiency | 0 = Not supported 1 = Supported | 0 = Not supported 1 = supported | 1 = Yes 0 = No | RFU | RFU |

As shown in Table 7, fields numbered 7 and 6 of PRU static may be assigned as an NFC receiver field. When the fields numbered 7 and 6 have a value of 01, the fields numbered 7 and 6 may indicate that the wireless power receiver 250 includes an NFC communication circuit (e.g., the NFC receiver 260), that the included NFC communication circuit is not affected by the transmission/reception of wireless power, and that an NFC tag is not detected around the wireless power receiver 250. Alternatively, when the fields numbered 7 and 6 of PRU static have a value of 10, the fields numbered 7 and 6 may signify that the wireless power receiver 250 includes the NFC communication circuit, and that the included NFC communication circuit is affected by the transmission/reception of wireless power or the NFC tag is detected around the wireless power receiver. In a case other than the above-described cases, the value of the fields numbered 7 and 6 may be set to 00.

Accordingly, when the wireless power transmitter 200 receives a PRU static signal of which the NFC receiver field of PRU static has a value of 10, the wireless power transmitter 200 may re-detect an NFC tag in the power save mode, or may enter the latch fault mode. When the wireless power transmitter 200 receives a PRU static signal of which the NFC receiver field of PRU static has a value of 01, the wireless power transmitter 200 may perform a subscription process and a charging process.

Alternatively, the wireless power receiver 250 may include, in a PRU Dynamic signal, information on the detection of an NFC tag. Table 8 illustrates an example of a PRU static signal.

TABLE 8

| 7 6 5 | 4 | 3 | 2 | 1 | 0 |
|---|---|---|---|---|---|
| $V_{out}$ $I_{out}$ $T_{RATIO}$ | $V_{RECT\_MIN\_DYN}$ | $V_{RECT\_SET\_DYN}$ | $V_{RECT\_HIGH\_DYN}$ | Dyn PRU Info | RFU |

Table 9 below shows a detailed example of Dyn PRU Info of a field numbered 1 of the PRU Dynamic signal.

TABLE 9

| 7 | 6 | 5 | 4 | 3 | 2 | 1 | 0 |
|---|---|---|---|---|---|---|---|
| NFC receiver<br>00 = Not supported<br>01 = Unaffected NFC<br>10 = Affected NFC<br>11 = Reserved | RFU<br>RFU | RFU<br>RFU | RFU<br>RFU | RFU<br>RFU | RFU<br>RFU | RFU<br>RFU | RFU<br>RFU |

As shown in Table 9, fields numbered 7 and 6 of Dyn PRU Info of the field numbered 1 of the PRU Dynamic signal may be assigned as an NFC receiver field. When the fields numbered 7 and 6 have a value of 01, the fields numbered 7 and 6 may indicate that the wireless power receiver 250 includes an NFC communication circuit, that the included NFC communication circuit is not affected by the transmission/reception of wireless power, and that an NFC tag is not detected around the wireless power receiver 250. Alternatively, when the fields numbered 7 and 6 of PRU static have a value of 10, the fields numbered 7 and 6 may signify that the wireless power receiver 250 includes the NFC communication circuit, and that the included NFC communication circuit is affected by the transmission/reception of wireless power or the NFC tag is detected around the wireless power receiver 250. In a case other than the above-described cases, the value of the fields numbered 7 and 6 may be set to 00.

Accordingly, when the wireless power transmitter 200 receives a PRU static signal of which the NFC receiver field has a value of 10, the wireless power transmitter 200 may re-detect an NFC tag in the power save mode, or may enter the latch fault mode. When the wireless power transmitter 200 receives a PRU static signal of which the NFC receiver field has a value of 01, the wireless power transmitter may perform a subscription process and a charging process.

Alternatively, the wireless power receiver may transmit information, which is related to the detection of an external NFC tag, by using a PRU Alert signal.

Figure 18:
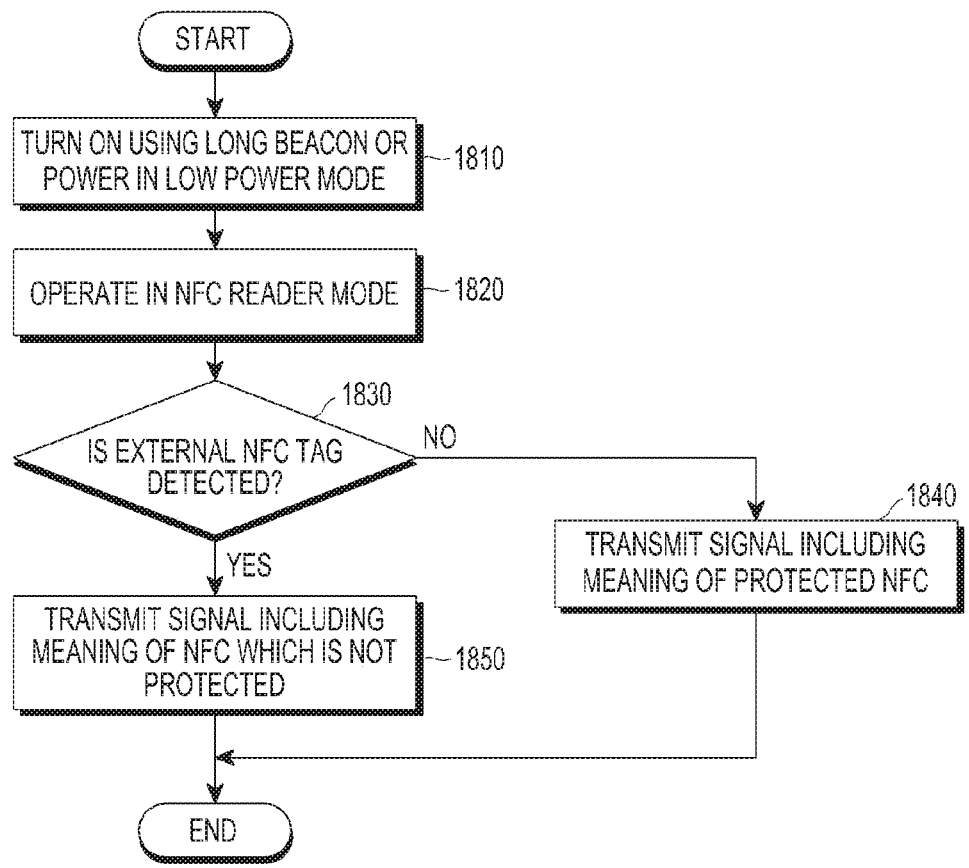
FIG. 18 is a flowchart of a control method of a wireless power receiver, according to an embodiment of the present disclosure.

FIG. 18 is a flowchart of a control method of a wireless power receiver, according to an embodiment of the present disclosure. Referring to FIG. 18, in step 1810, the wireless power receiver 250 is turned on by using a long beacon power or power in a low power mode. For example, the wireless power receiver 250 may turn on the communication module 253 and/or controller 252 by using a long beacon power or power in the low power mode. Alternatively, the wireless power receiver 250 may have previously turned on the communication module 253 and/or controller 252, and may drive the communication module 253 and/or controller 252 by using a long beacon power or power in the low power mode.

In step 1820, the wireless power receiver 250 operates in an NFC reader mode. When it is determined that the long beacon power or the power in the low power mode is received, the wireless power receiver 250 may operate in the NFC reader mode. For example, when it is determined that a voltage Vout of the output end of the rectifier exceeds a threshold, the wireless power receiver may control the NFC communication module to operate in the NFC reader mode. When the wireless power receiver 250 has previously operated in an NFC tag mode, the wireless power receiver 250 may disable an NFC tag function, and may operate in the NFC reader mode. The NFC antenna of the wireless power receiver 250 may transmit a radio wave.

In step 1830, the wireless power receiver 250 determines whether an external NFC tag is detected. For example, the wireless power receiver 250 may determine whether the external NFC tag is detected, on the basis of whether a feedback radio wave corresponding to the transmitted radio wave has been received. Alternatively, the wireless power receiver 250 may analyze information included in the received feedback radio wave, and thereby may determine whether the relevant feedback radio wave is received from the NFC tag. The wireless power receiver 250 may output an indication that a user can recognize.

When it is determined that no external NFC tag has been detected, in step 1840, the wireless power receiver 250 transmits a signal including information indicating the protected NFC. The information indicating the protected NFC may indicate that wireless power receiver 250 is designed for protecting NFC tag circuit. When it is determined that the external NFC tag has been detected, in step 1850, the wireless power receiver 250 transmits a signal including information indicating the not-protected NFC. As described above, when the signal including information indicating the protected NFC_has been received, the wireless power transmitter 200 may proceed to a subscription process and a charging process. In contrast, when the wireless power transmitter 200 has received the signal including information indicating the not-protected NFC, the wireless power transmitter 200 may re-detect an NFC tag in a power save mode, or may enter a latch fault mode.

Figure 19:
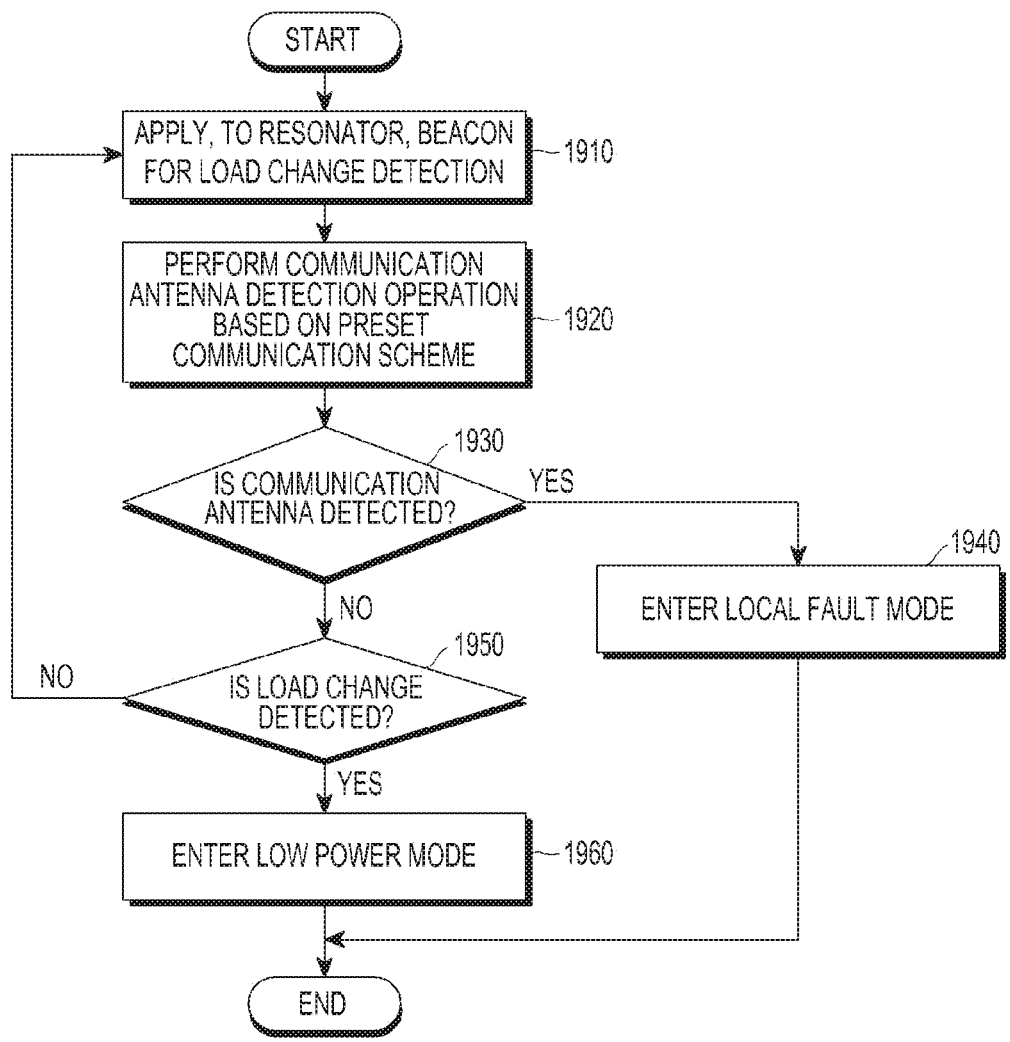
FIG. 19 is a flowchart of a control method of a wireless power transmitter, according to an embodiment of the present disclosure.

FIG. 19 is a flowchart of a control method of a wireless power transmitter, according to an embodiment of the present disclosure.

Referring to FIG. 19, in step 1910, the wireless power transmitter 200 applies, to the Tx resonator 211a, a beacon power for impedance change detection. For example, the wireless power transmitter 200 may apply, to the Tx resonator 211a, detection power such as the detection power 611 illustrated in FIG. 6.

In step 1920, the wireless power transmitter 200 performs a communication antenna detection step which is based on a preset communication scheme. For example, the wireless power transmitter may transmit a radio wave capable of being received by a communication antenna, and may detect a radio wave fed back from the communication antenna.

In step 1930, the wireless power transmitter 200 determines whether the communication antenna has been detected. When it is determined that the communication antenna has been detected, in step 1940, the wireless power transmitter 200 enters a local fault mode. In the local fault mode, the wireless power transmitter 200 does not apply a beacon power, namely, detection power, to the Tx resonator 211a. In the local fault mode, the wireless power transmitter 200 may perform a communication antenna detection operation. The wireless power transmitter 200 may determine whether the communication antenna is moved at preset intervals. For example, until it is determined that the communication antenna has been moved, the wireless power transmitter 200 may perform a communication antenna detection operation in the local fault mode. That is, a condition for a mode transition from the local fault mode to another mode may correspond to the removal of a communication antenna or failure to detect the communication antenna. In this case, the wireless power transmitter 200 may enter a power save mode from the local fault mode. After the wireless power transmitter 200 enters a PTU configuration mode from the local fault mode, the wireless power transmitter 200 may confirm whether the communication antenna has been removed, and may enter the power save mode. Alternatively, the wireless power transmitter 200 may enter a latch fault mode.

When it is determined that no communication antenna has been detected, in step 1950, the wireless power transmitter 200 determines whether an impedance change is detected. For example, the wireless power transmitter 200 may determine whether an impedance of the Tx resonator 211a is changed during a beacon power application time period. As described above, when the impedance has been changed, the wireless power transmitter 200 may determine that the wireless power receiver 250 has been detected. Alternatively or additionally, when a time point of changing the impedance of the Tx resonator 211a is close enough to a time point of receiving an advertisement signal, the wireless power transmitter 200 may determine that the wireless power receiver 250 is placed nearby.

When the impedance change has been detected, in step 1960, the wireless power transmitter 200 enters a low power mode, and applies, to the Tx resonator 211a, driving power such as the driving power 620 illustrated in FIG. 6. The driving power may have, for example, enough magnitude to wake up the controller 252 and/or communication module 253 of the wireless power receiver 250.

The embodiments disclosed herein are merely provided to describe technical contents of the present disclosure and to help an understanding of the present disclosure, and are not intended to limit the scope of the present disclosure. Therefore, it should be understood by those of skill in the art that all modifications and changes or various other embodiments which are based on the technical idea of the present disclosure are included in the scope of the present disclosure, which is defined, not by the detailed description and embodiments, but by the appended claims and their equivalents.

What is claimed is:

1. A wireless power receiver, comprising:
a resonant circuit;
a communication module; and
a controller,
wherein the resonant circuit receives a driving power for driving at least one of the communication module and the controller, and
wherein the controller is configured to:
after the driving power is received through the resonant circuit, identify whether a near-field communication (NFC) tag is detected or not, wherein the NFC tag is external to a wireless power transmitter and the wireless power receiver, and
based on identifying that the external NFC tag is detected, transmit, by using the communication module, a power receiving unit (PRU) advertisement signal for establishing a communication connection with the wireless power transmitter, wherein the PRU advertisement signal includes first information indicating that an NFC receiver included in the wireless power receiver is affected by a wireless power transmission, to the wireless power transmitter.

2. The wireless power receiver of claim 1, wherein the controller is further configured to:
operate in an NFC reader mode, and
identify that the external NFC tag is detected while operating in the NFC reader mode.

3. The wireless power receiver of claim 1, herein the controller is further configured to:
based on identifying that the external NFC tag is not detected, transmit, by using the communication module, another PRU advertisement signal for establishing the communication connection with the wireless power transmitter, wherein the other PUT advertisement signal includes second information indicating that the NFC receiver included in the wireless power receiver is not affected by a wireless power transmission, to the wireless power transmitter.

4. A control method of a wireless power receiver, the control method comprising:
after a driving power for driving at least one of a communication circuit of the wireless power receiver or a controller of the wireless power receiver is received through a resonant circuit of the wireless power receiver, identifying, by the controller, whether a near-field communication (NFC) tag is detected or not, wherein the NFC tag is external to a wireless power transmitter and the wireless power receiver; and
based on identifying that the external NFC tag is detected, transmitting, by using the communication circuit, a power receiving unit (PRU) advertisement signal for establishing a communication connection with the wireless power transmitter, wherein the PRU advertisement signal includes first information indicating that an NFC receiver included in the wireless power receiver is affected by a wireless power transmission, to the wireless power transmitter.

5. The control method of claim 4, further comprising:
operating in an NFC reader mode; and
identifying that the external NFC tag is detected while operating in the NFC reader mode.

6. The control method of claim 4, further comprising:
based on identifying that the external NFC tag is not detected, transmitting another PRU advertisement signal for establishing the communication connection with the wireless power transmitter, wherein the other NW advertisement signal includes second information indicating that, the NFC receiver included in the wireless power receiver is not affected by a wireless power transmission, to the wireless power transmitter.

7. A wireless power receiver, comprising:
a resonant circuit;
a communication module; and
a controller,
wherein the resonant circuit receives a driving power for driving at least one of the communication module and the controller, or a charging power for charging the wireless power receiver, and
wherein the controller is configured to:
after the driving power or the charging power is received, identify whether a near-field communication (NFC) tag is detected or not, wherein the NFC tag is external to a wireless power transmitter and the wireless power receiver, based on identifying that the external NFC tag is not detected and an NFC receiver included in the wireless power receiver is not affected by a wireless power transmission, transmit, by using the communication module and over a communication connection established between the wireless power receiver and the wireless power transmitter, a signal including first information indicating that the NFC receiver included in the wireless power receiver is not affected by the wireless power transmission, to the wireless power transmitter.

8. The wireless power receiver of claim 7, wherein the signal is a power receiving unit (PRU) static signal or a PRU dynamic signal.

9. The wireless power receiver of claim 8, wherein the first information is expressed as bits of "01".

10. The wireless power receiver of claim 7, wherein the controller is further configured to:

based on identifying that the external NFC tag is detected, transmit, by using the communication module and over the communication connection established between the wireless power receiver and the wireless power transmitter, another signal including second information indicating that the NFC receiver included in the wireless power receiver is affected by the wireless power transmission, to the wireless power transmitter.

11. The wireless power receiver of claim 10, wherein the another signal is a power receiving unit (PRU) static signal or a PRU dynamic signal.

12. The wireless power receiver of claim 11, wherein the second information is expressed as bits of "10".

13. The wireless power receiver of claim 7, wherein the controller is further configured to:

based on identifying that the NFC receiver included in the wireless power receiver is affected by the wireless power transmission, transmit, by using the communication module and over the communication connection established between the wireless power receiver and the wireless power transmitter, another signal including second information indicating that the NFC receiver included in the wireless power receiver is affected by the wireless power transmission, to the wireless power transmitter.

14. The wireless power receiver of claim 13, wherein the another signal is a power receiving unit (PRU) static signal or a PRU dynamic signal.

15. The wireless power receiver of claim 14, wherein the second information is expressed as bits of "10".

16. The wireless power receiver of claim 7, wherein the controller is further configured to operate in an NFC reader mode and identify that the external NFC tag is detected while operating in the NFC reader mode.

17. A control method of a wireless power receiver, the control method comprising:

after a driving power for driving at least one of a communication circuit of the wireless power receiver or a controller of the wireless power receiver, or a charging power for charging the wireless power receiver is received through a resonant circuit of the wireless power receiver, identifying, by the controller, whether a near-field communication (NFC) tag is detected or not, wherein the NFC tag is external to a wireless power transmitter and the wireless power receiver; and based on identifying that the external NFC tag is not detected and an NFC receiver included in the wireless power receiver is not affected by a wireless power transmission, transmitting, by using the communication circuit, over a communication connection established between the wireless power receiver and the wireless power transmitter, a signal including first information indicating that the NFC receiver included in the wireless power receiver is not affected by the wireless power transmission, to the wireless power transmitter.

18. The control method of claim 17, wherein the signal is a power receiving unit (PRU) static signal or a PRU dynamic signal.

19. The control method of claim 18, wherein the first information is expressed as bits of "01".

20. The control method of claim 17, further comprising:

based on identifying that the external NFC tag is detected, transmitting, over the communication connection established between the wireless power receiver and the wireless power transmitter, another signal including second information indicating that the NFC receiver included in the wireless power receiver is affected by the wireless power transmission, to the wireless power transmitter.

21. The control method of claim 20, wherein the another signal is a power receiving unit (PRU) static signal or a PRU dynamic signal.

22. The control method of claim 21, wherein the second information is expressed as bits of "10".

23. The control method of claim 17, further comprising:

based on identifying that the NFC receiver included in the wireless power receiver is affected by the wireless power transmission, transmitting, over the communication connection established between the wireless power receiver and the wireless power transmitter, a second signal including second information indicating that the NFC receiver included in the wireless power receiver is affected by the wireless power transmission, to the wireless power transmitter.

24. The control method of claim 23, wherein the another signal is a power receiving unit (PRU) static signal or a PRU dynamic signal.

25. The control method of claim 24, wherein the second information is expressed as bits of "10".

26. The control method of claim 17, further comprising:

operating in an NFC reader mode and identifying that the external NFC tag is detected while operating in the NFC reader mode.

* * * * *

UNITED STATES PATENT AND TRADEMARK OFFICE
CERTIFICATE OF CORRECTION

| | | |
|---|---|---|
| PATENT NO. | : 11,641,221 B2 | Page 1 of 1 |
| APPLICATION NO. | : 16/548345 | |
| DATED | : May 2, 2023 | |
| INVENTOR(S) | : Kyung-Woo Lee et al. | |

It is certified that error appears in the above-identified patent and that said Letters Patent is hereby corrected as shown below:

In the Claims

In Column 32, Line 52, in Claim 6:
"the wireless power transmitter, wherein the other NW"
Should be:
-- the wireless power transmitter, wherein the other PRU --

Signed and Sealed this
Sixteenth Day of April, 2024

Katherine Kelly Vidal
*Director of the United States Patent and Trademark Office*